United States Patent
Pletka et al.

(10) Patent No.: US 11,360,903 B2
(45) Date of Patent: **\*Jun. 14, 2022**

(54) DATA PLACEMENT IN WRITE CACHE ARCHITECTURE SUPPORTING READ HEAT DATA SEPARATION

(71) Applicant: International Business Machines Corporation, Armonk, NY (US)

(72) Inventors: Roman Alexander Pletka, Uster (CH); Timothy Fisher, Cypress, TX (US); Aaron Daniel Fry, Richmond, TX (US); Nikolaos Papandreou, Thalwil (CH); Nikolas Ioannou, Zurich (CH); Sasa Tomic, Kilchberg (CH); Radu Ioan Stoica, Zurich (CH); Charalampos Pozidis, Thalwil (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,939

(22) Filed: Feb. 3, 2021

(65) Prior Publication Data

US 2021/0157735 A1 May 27, 2021

Related U.S. Application Data

(63) Continuation of application No. 16/508,140, filed on Jul. 10, 2019, now Pat. No. 10,977,181.

(51) Int. Cl.
*G06F 12/08* (2016.01)
*G06F 12/0871* (2016.01)
*G06F 12/02* (2006.01)

(52) U.S. Cl.
CPC ...... *G06F 12/0871* (2013.01); *G06F 12/0246* (2013.01)

(58) Field of Classification Search
CPC .................................................. G06F 12/0871
See application file for complete search history.

(56) References Cited

U.S. PATENT DOCUMENTS

| 8,661,196 B2 | 2/2014 | Eleftheriou et al. |
| 8,667,219 B2 | 3/2014 | Eleftheriou et al. |
| (Continued) | | |

FOREIGN PATENT DOCUMENTS

| CN | 104699424 A | 6/2015 |
| CN | 108762664 A | 11/2018 |

OTHER PUBLICATIONS

Sudan, K., "Data Placement for Efficient Main Memory Access," A Dissertation submitted to the University of Utah School of Computing, May 2013, 113 pages.

(Continued)

*Primary Examiner* — Jae U Yu
(74) *Attorney, Agent, or Firm* — Zilka-Kotab, P.C.

(57) ABSTRACT

A computer-implemented method, according to one approach, includes: determining a current read heat value of each logical page which corresponds to write requests that have accumulated in a destage buffer. Each of the write requests is assigned to a respective write queue based on the current read heat value of each logical page which corresponds to the write requests. Moreover, each of the write queues correspond to a different page stripe which includes physical pages, the physical pages included in each of the respective page stripes being of a same type. Other systems, methods, and computer program products are described in additional approaches.

18 Claims, 15 Drawing Sheets

(56) References Cited

U.S. PATENT DOCUMENTS

| | | | |
|---|---|---|---|
| 9,779,021 B2 | 10/2017 | Camp et al. | |
| 9,870,285 B2 | 1/2018 | Camp et al. | |
| 10,126,971 B1 | 11/2018 | Jain et al. | |
| 10,977,181 B2 | 4/2021 | Pletka et al. | |
| 2005/0006471 A1* | 1/2005 | Bedell | G06K 7/0004 |
| | | | 235/440 |
| 2006/0074970 A1 | 4/2006 | Narayanan et al. | |
| 2012/0059994 A1 | 3/2012 | Montgomery et al. | |
| 2013/0318283 A1 | 11/2013 | Small et al. | |
| 2018/0373428 A1 | 12/2018 | Kan et al. | |
| 2021/0011852 A1 | 1/2021 | Pletka et al. | |

OTHER PUBLICATIONS

Khan et al., "Improving Cache Performance by Exploiting Read-Write Disparity," University of Virginia Engineering, 2014, pp. 1-12, retrieved from https://www.cs.virginia.edu/~smk9u/khan-rwp-hpca2014.pdf.

Cheng, Y., "Workload-aware Efficient Storage Systems," A Dissertation submitted to the Virginia Polytechnic Institute and State University, Jun. 22, 2017, 152 pages.

IBM, "Optimized Architectures and Methods for Implementing NAND Flash in Storage—NAND Flash as Read Only Cache—As SD-Card in Hybrid Hard Drive—Algorithms to Optimize Read Many Write Few Caching—Method for Analyzing System Characteristics for Optimal NAND Flash/Hard Disk Ratios," IP.com Prior Art Database Technical Disclosure, IPCOM000190167D, Nov. 18, 2009, pp. 1-5.

Anonymous, "Passing information from Host to a Flash System to help improve performance and decrease write amplification," IP.com Prior Art Database Technical Disclosure, IPCOM000236795D, May 16, 2014, pp. 1-2.

Anonymous, "Method and System for Performing Segregation of Data Being Moved during Data Retention of Flash Blocks to Reduce Write Amplification," IP.com Prior Art Database Technical Disclosure, IPCOM000245020D, Feb. 6, 2016, pp. 1-4.

Anonymous, "Method and System for Recovering from Partial Writes on a Storage System Using Log Structured Array," IP.com Prior Art Database Technical Disclosure, IPCOM000248720D, Dec. 29, 2016, pp. 1-5.

Frese et al., "IBM System Storage DS8700 Performance with Easy Tier," IBM Corporation, May 2010, pp. 1-30.

Pletka et al., U.S. Appl. No. 16/508,140, filed Jul. 10, 2019.

International Search Report and Written Opinion from PCT Application No. PCT/IB2020/056017, dated Sep. 27, 2020.

Notice of Allowance from U.S. Appl. No. 16/508,140, dated Dec. 7, 2020.

IBM, List of IBM Patents or Patent Applications Treated as Related, Mar. 12, 2021, 2 pages.

* cited by examiner

DATA PLACEMENT IN WRITE CACHE ARCHITECTURE SUPPORTING READ HEAT DATA SEPARATION

BACKGROUND

The present invention relates to data storage systems, and more particularly, this invention relates to selective data placement in write cache architecture which supports read heat data separation.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations take approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

Read latency characteristics have continued to increase as memory such as NAND Flash continues to advance. This is particularly true as the number of bits stored per cell increases, as read latency increases proportionally with the number of read threshold voltages that have to be applied upon reading the page. Therefore, some conventional NAND Flash architectures exhibit significant latency differences depending on the page type.

It follows that larger storage systems which target low latency have experienced significant challenges as a result of this trend. For instance, existing NAND Flash generations with lower latencies will eventually be superseded by newer generations that can store more data, but which also have inferior latency properties. Conventional controllers which are used to manage data stored on such memory are also faced with similar challenges.

SUMMARY

A computer-implemented method, according to one approach, includes: determining a current read heat value of each logical page which corresponds to write requests that have accumulated in a destage buffer. Each of the write requests is assigned to a respective write queue based on the current read heat value of each logical page which corresponds to the write requests. Moreover, each of the write queues correspond to a different page stripe which includes physical pages, the physical pages included in each of the respective page stripes being of a same type.

Different types of physical pages experience different amounts of read latency due to their respective physical construction and the different resulting processes involved with actually reading data from each of them. Accordingly, by establishing a relationship between each of the write queues and a respective one of the open page stripes, the system is able to improve operational efficiency by taking advantage of the relationship identified as existing between read latency and read heat. In other words, the read latency associated with the pages of a given page type may be used to select the write queue that is assigned thereto based on the corresponding read heat. In doing so, the approaches included herein are able to desirably reduce the overall amount of processing delays experienced by a system as a whole.

Further still, the computer-implemented method in some approaches includes: receiving a read request which corresponds to data stored in one or more logical pages, and incrementing a read heat value associated with each of the one or more logical pages. The read request is also satisfied.

Various ones of the approaches included herein are able to achieve selective data placement in write cache architecture which supports read heat data separation. As a result, read latency is significantly reduced for various types and generations of memory. These approaches are able to leverage the different latency properties of the different types of physical pages in multi-bit-per-cell memory (e.g., such as TLC and QLC NAND Flash) to significantly reduce the read latency experienced by the overarching data storage system as a whole. These improvements are achieved in some approaches by tracking the read heat of the data stored in memory, and selectively organizing the data in memory according to the read heat, e.g., as will be described in further detail below.

A computer program product, according to another approach, includes a computer readable storage medium having program instructions embodied therewith. The program instructions are readable and/or executable by a processor to cause the processor to perform the foregoing method.

A system, according to yet another approach, includes: a plurality of non-volatile random access memory (NVRAM) blocks configured to store data. The system also includes a processor and logic integrated with and/or executable by the processor. Moreover, the logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
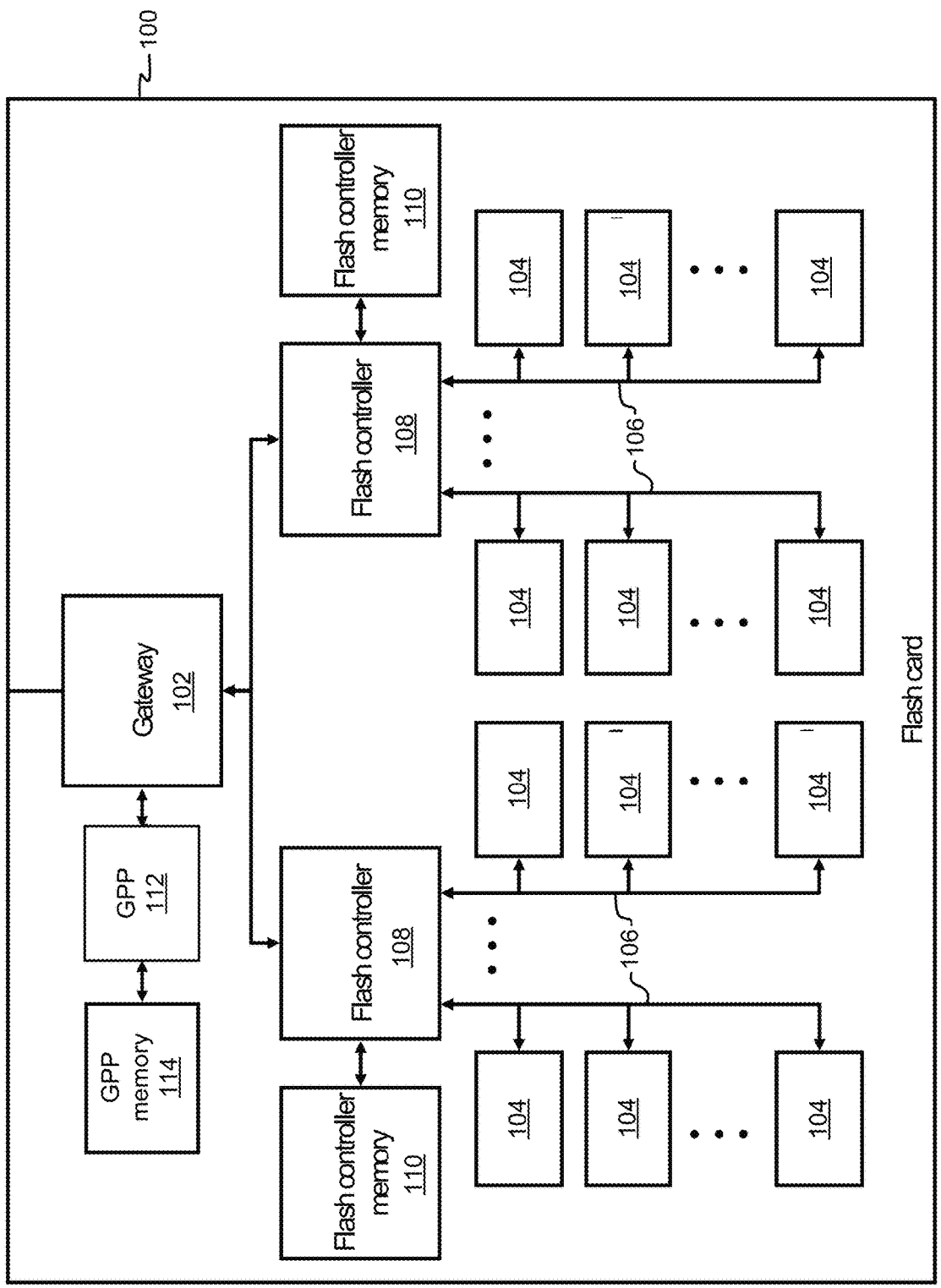
FIG. 1 is a diagram of a non-volatile memory card, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of data storage systems, as well as operation and/or component parts thereof. It should be appreciated that various approaches herein can be implemented with a wide range of memory mediums, including for example NVRAM technologies such as NAND Flash memory, NOR Flash memory, phase-change memory (PCM), magnetoresistive RAM (MRAM) and resistive RAM (RRAM). To provide a context, and solely to assist the reader, various approaches may be described with reference to a type of non-volatile memory. This has been done by way of example only, and should not be deemed limiting on the invention defined in the claims.

In one general approach, a computer-implemented method includes: receiving write requests, accumulating the write requests in a destage buffer, and determining a current read heat value of each logical page which corresponds to the write requests. Each of the write requests is assigned to a respective write queue based on the current read heat value of each logical page which corresponds to the write requests. Moreover, each of the write queues correspond to a different page stripe which includes physical pages, the physical pages included in each of the respective page stripes being of a same type. Furthermore, data in the write requests is destaged from the write queues to their respective page stripes.

In another general approach, a computer program product includes a computer readable storage medium having program instructions embodied therewith. The program instructions are readable and/or executable by a processor to cause the processor to: perform the foregoing method.

In yet another general approach, a system includes: a plurality of non-volatile random access memory (NVRAM) blocks configured to store data. The system also includes a processor and logic integrated with and/or executable by the processor. Moreover, the logic is configured to: perform the foregoing method.

In another general approach, a computer-implemented method includes: receiving write requests, accumulating the write requests in a destage buffer, and determining whether each of the write requests are a host write request. In response to determining that a write request is not a host write request, a current read heat value of each logical page which corresponds to the write request is determined. The write request is also assigned to a write queue based on the current read heat value of each logical page which corresponds to the write request. Each of the write queues correspond to a different page stripe which includes physical pages, and the physical pages included in each of the respective page stripes are of a same type. However, in response to determining that a write request is a host write request, the write request is assigned to a supplemental write queue.

In still another general approach, a computer program product includes a computer readable storage medium having program instructions embodied therewith. The program instructions are readable and/or executable by a processor to cause the processor to: perform the foregoing method.

FIG. 1 illustrates a memory card 100, in accordance with one approach. It should be noted that although memory card 100 is depicted as an exemplary non-volatile data storage card in the present approach, various other types of non-volatile data storage cards may be used in a data storage system according to alternate approaches. It follows that the architecture and/or components of memory card 100 are in no way intended to limit the invention, but rather have been presented as a non-limiting example.

Moreover, as an option, the present memory card 100 may be implemented in conjunction with features from any other approach listed herein, such as those described with reference to the other FIGS. However, such memory card 100 and others presented herein may be used in various applications and/or in permutations which may or may not be specifically described in the illustrative approaches listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various approaches, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various approaches.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various approaches described herein. However, depending on the desired approach, the controller memory 110 may be battery-backed dynamic random-access memory (DRAM), phase-change memory PC-RAM, MRAM, STT-MRAM, etc., or a combination thereof.

Figure 2:
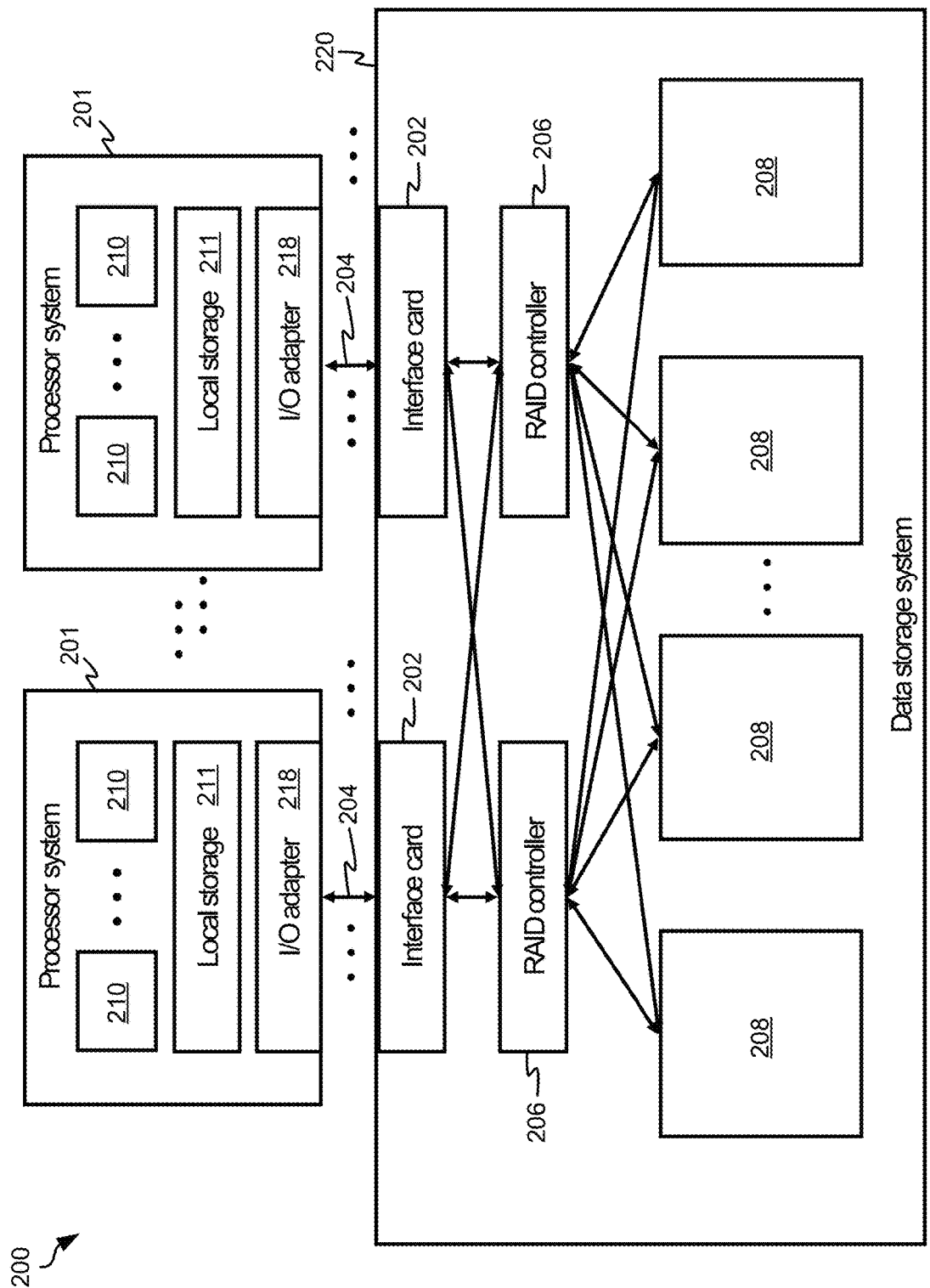
FIG. 2 is a diagram of a data storage system architecture, in accordance with one approach.

As previously mentioned, memory card 100 may be implemented in various types of data storage systems, depending on the desired approach. FIG. 2 illustrates a data storage system architecture 200 according to an exemplary approach which is in no way intended to limit the invention. Moreover, it should be noted that the data storage system 220 of FIG. 2 may include various components found in the approach of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-6, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired approach. Specifically, memory controllers or GPP 112 may include logic configured to perform any one or more of the following functions, which are in no way intended to be an exclusive list. In other words, depending on the desired approach, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary approach, which is in no way intended to limit the invention, memory controllers (e.g., see 108 of FIG. 1) and/or GPP 112 may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat segregation.

Write Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate lower than hot blocks.

Tracking the write heat of a logical page may involve, for instance, allocating a certain number of bits in the LPT mapping entry for the page to keep track of how many write requests the page has seen in a certain time period or window. Typically, host write requests increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained, e.g., as will be described in further detail below with respect to FIGS. 5A-7B. However, it should be noted that the number of read requests to and/or read operations performed on a memory block may not come into play for write heat segregation when determining the write heat of the memory block for some approaches. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat segregation may be achieved. In particular, write heat segregating methods may group hot memory pages together in certain memory blocks while cold memory pages are grouped together in separate memory blocks. Thus, a write heat segregated LEB tends to be occupied by either hot or cold data.

The merit of write heat segregation is two-fold. First, performing a garbage collection process on a hot memory block will prevent triggering the relocation of cold data as well. In the absence of write heat segregation, updates to hot data, which are performed frequently, also results in the undesirable relocations of all cold data collocated on the same LEB as the hot data being relocated. Therefore, the write amplification incurred by performing garbage collection is much lower for approaches implementing write heat segregation.

Secondly, the relative write heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing write heat segregation.

Write Allocation

Write allocation includes placing data of write requests into free locations of open LEBs. As soon as all pages in a LEB have been written, the LEB is closed and placed in a pool holding occupied LEB s. Typically, LEB s in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired approach, logic of a storage system may be configured to perform additional or alternative functions, as would be appreciated by one skilled in the art upon reading the present description.

Figure 3:
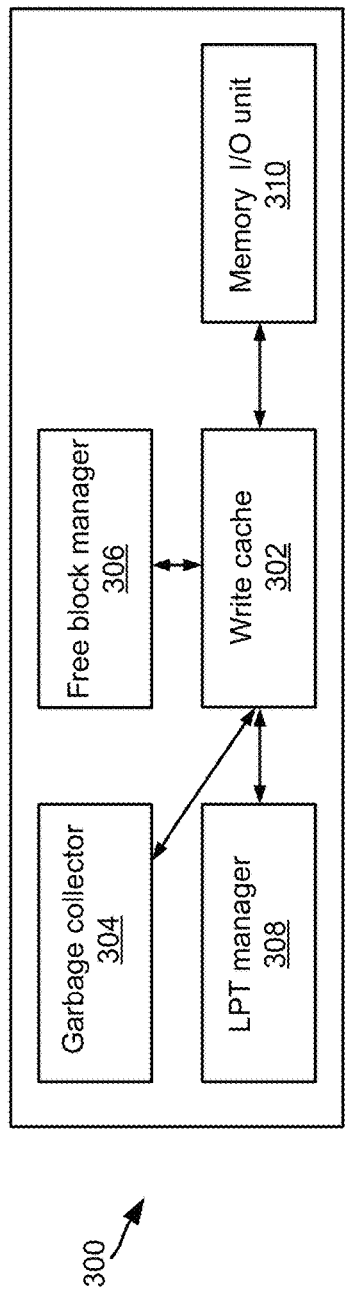
FIG. 3 is a system diagram, in accordance with one approach.

Referring now to FIG. 3, a system 300 is illustrated in accordance with one approach. As an option, the present system 300 may be implemented in conjunction with features from any other approach listed herein, such as those described with reference to the other FIGS. However, such system 300 and others presented herein may be used in various applications and/or in permutations which may or may not be specifically described in the illustrative approaches listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired approach. According to an exemplary approach, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB or 16 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
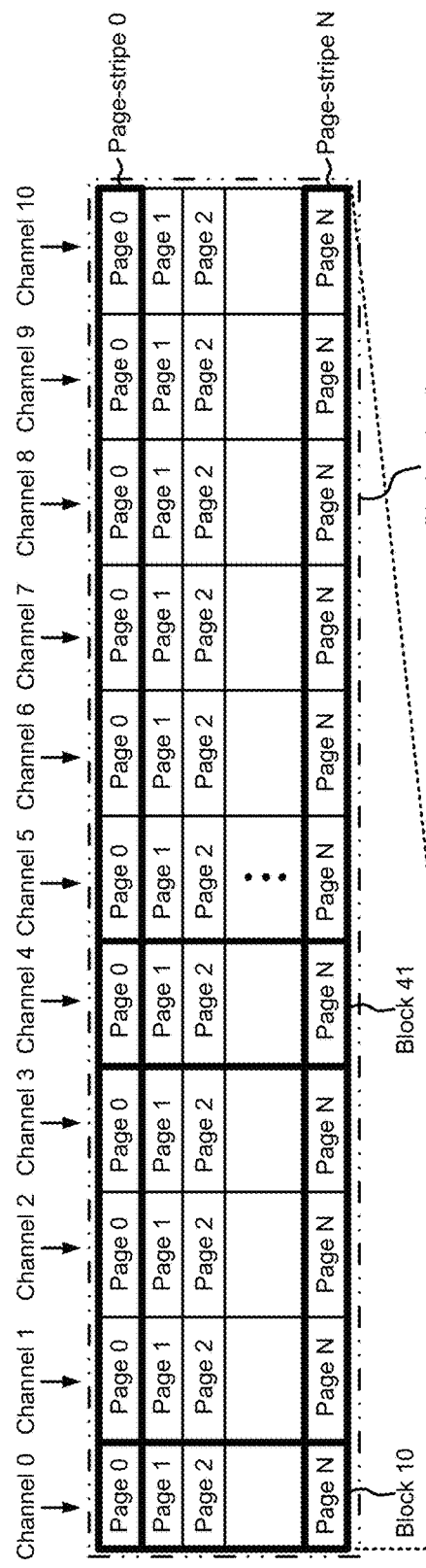
FIG. 4 is a conceptual diagram which includes a block-stripe and page-stripe, in accordance with one approach.
Figure 4:
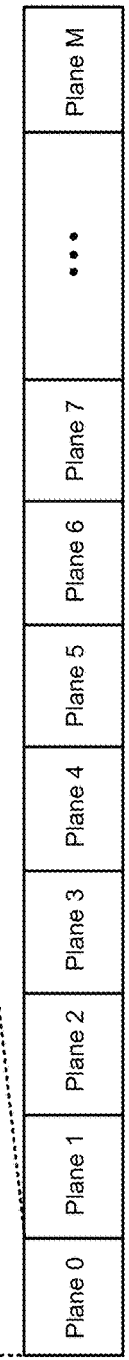

To better understand the distinction between block-stripes and page-stripes as used herein, FIG. 4 is a conceptual diagram 400, in accordance with one approach. LEBs are built from block stripes and typically a single block stripe is used to build a LEB. However, alternative approaches may use multiple block stripes to form an LEB. As an option, the present conceptual diagram 400 may be implemented in conjunction with features from any other approach listed herein, such as those described with reference to the other FIGS. However, such conceptual diagram 400 and others presented herein may be used in various applications and/or in permutations which may or may not be specifically described in the illustrative approaches listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired approach, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given approach of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some approaches one or more blocks of a block-stripe may belong to different physical planes. It follows that each aggregated plane may include one or more block-stripe. Thus, according to an illustrative approach, Block 0 through Block 10 from different physical planes may constitute a block-stripe.

Regardless of whether the conceptual diagram 400 of FIG. 4 is implemented with non-volatile memory and/or a cache architecture, in different approaches, the number of pages in each block and/or the number of channels in each plane may vary depending on the desired approach. According to an exemplary approach, which is in no way intended to limit the invention, a block may include 256 pages, but could include more or less in various approaches. Analogously, the number of channels per plane and/or the number of planes may vary depending on the desired approach.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, read latency characteristics have continued to increase as memory such as NAND Flash continues to advance. This is particularly true as the number of bits stored per cell increases, as read latency increases proportionally with the number of read threshold voltages that have to be applied upon reading the page. Therefore, some conventional NAND Flash architectures exhibit significant latency differences depending on the page type. For example, while two-dimensional (2D) multi-level cell (MLC) memory experiences an average read latency in the range of 50 to 100 microseconds (µs), three-dimensional (3D) triple-level cell (TLC) memory experiences an average read latency increase of about 1.4 times that experienced by MLC memory. Furthermore, 3D quad-level cell (QLC) memory experiences an average read latency increase of about 2.5 times that experienced by MLC memory.

It follows that larger storage systems which target low latency have experienced significant challenges as a result of this trend. For instance, existing NAND Flash generations with lower latencies will eventually be superseded by newer generations that can store more data, but which also have inferior latency properties. Conventional controllers which are used to manage data stored on such memory are also faced with similar challenges.

In sharp contrast to these conventional shortcomings, various ones of the approaches included herein are able to achieve selective data placement in write cache architecture which supports read heat data separation. As a result, read latency is significantly reduced for various types and generations of memory. These improvements are achieved, at least in part, as a result of identifying that real-world workloads are typically skewed. In other words, while a portion of the data stored in memory is read relatively frequently, other portions of data are rarely read. Write operations are also skewed in a similar manner. Further, frequently updated portions of data typically do not overlap with portions of data which are frequently read. In other words, a significant portion of data is written to memory once and subsequently read often, while other portions of data is frequently overwritten yet rarely read, e.g., such as logs.

Accordingly, various ones of the approaches included herein are able to leverage the different latency properties of the different types of physical pages in multi-bit-per-cell memory (e.g., such as TLC and QLC NAND Flash) to significantly reduce the read latency experienced by the overarching data storage system as a whole. These improvements are achieved in some approaches by tracking the read heat of the data stored in memory, and selectively organizing the data in memory according to the read heat, e.g., as will be described in further detail below.

These improvements in read latency may be achieved by a number of different memory configurations and/or controller architectures that support read heat separation. For example, some of the approaches described herein are implemented in controller architectures which manage memory that is only configured in multi-bit-per-cell mode. Yet other ones of the approaches presented herein are implemented in hybrid controller architectures which manage memory configured in SLC mode as well as memory configured in multi-bit-per-cell mode. These two memory configurations are also implemented in a same storage device in some approaches.

Figure 5A:
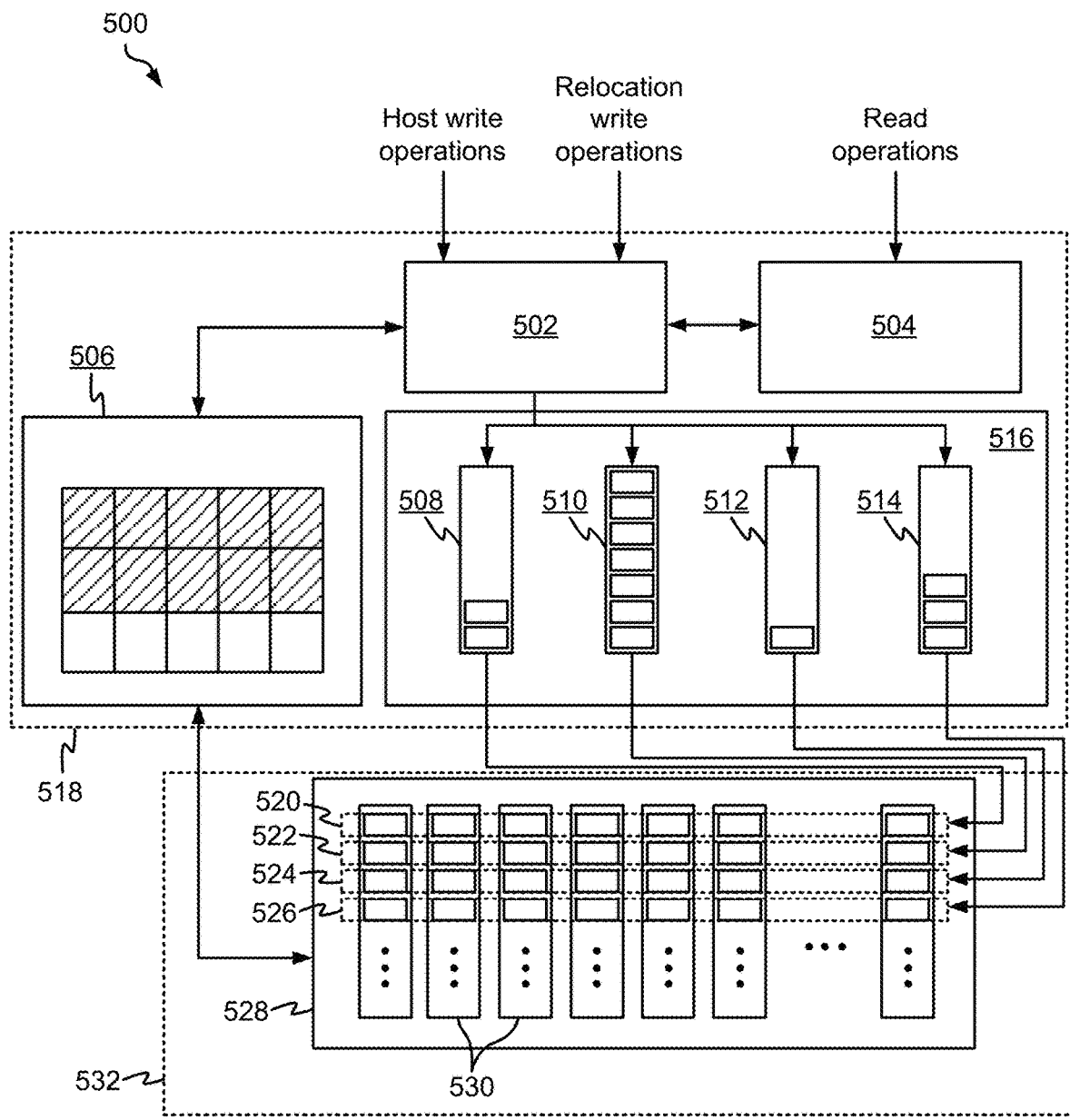
FIG. 5A is a partial representational view of a data storage system, in accordance with one approach.

According to one such approach, which is in no way intended to limit the invention, FIG. 5A depicts a data storage system 500 which implements a controller architecture that manages memory that is only configured in multi-bit-per-cell mode. As an option, the present data storage system 500 may be implemented in conjunction with features from any other approaches listed herein, such as those described with reference to the other FIGS., such as FIGS. 1-4. However, such data storage system 500 and others presented herein may be used in various applications and/or in permutations which may or may not be specifically described in the illustrative approaches listed herein. Further, the data storage system 500 presented herein may be used in any desired environment. Thus FIG. 5A (and the other FIGS.) may be deemed to include any possible permutation.

As show, the data storage system 500 includes a read heat separation unit 502 which is coupled to a read heat counter module 504 as well as a destage buffer 506. The read heat separation unit 502 is also coupled to a number of write queues 508, 510, 512, 514 which are included in a memory module 516. Moreover, each of the write requests which have accumulated in the write queues 508, 510, 512, 514 correspond to a shaded one of the entry locations in the destage buffer 506.

The aforementioned components in the data storage system 500 are depicted as being implemented in a controller 518 according to the present approach. However, this is in no way intended to limit the invention. For instance, in other approaches a controller may simply be coupled to the read heat separation unit 502, the read heat counter module 504, the destage buffer 506, and/or the memory module 516, e.g., such that commands, requests, instructions, etc. may be transferred therebetween.

Over time, the read heat separation unit 502 receives write requests from one or more hosts, running applications, other storage systems, etc. These write requests are typically either new write requests (also referred to herein as "host write requests") or relocate write requests. New write requests involve writing new data to memory for a first time, while relocate write requests involve rewriting data that is already stored in memory. These write requests are received and screened by the read heat separation unit 502, preferably such that appropriate action may be taken based on what type of write request has been received (e.g., see method 550 of FIG. 5B below).

With continued reference to FIG. 5A, each of the write queues 508, 510, 512, 514 are depicted as corresponding to a respective open block stripe 528 consisting of the exemplary page stripes 520, 522, 524, 526 in physical memory 532. Each of these open page stripes 520, 522, 524, 526 extend across a number of blocks 530 of non-volatile memory (e.g., such as NAND Flash), and page within a page stripe 520, 522, 524, 526 are of the same page type. According to an example, which is in no way intended to limit the invention, the memory 532 is 3D QLC memory which includes four different types of pages due to the physical construction of the memory cells therein. These page types include lower pages, upper pages, extra pages, and top pages, each of which have different performance characteristics. The page type within blocks and their respective sequence arrangements are related to the non-volatile memory (e.g., NAND flash memory) device structure which can vary between device generations and manufacturers. But pages with the same page index within a block typically are of the same type. For instance, different types of physical pages experience different amounts of read latency due to their respective physical construction and the different resulting processes involved with actually reading data from each of them, e.g., as would be appreciated by one skilled in the art after reading the present description. However, according to another example, the memory 532 is 3D TLC memory which includes three different types of pages due to the physical construction of the memory cells therein.

By establishing a relationship between each of the write queues 508, 510, 512, 514 and a respective one of the open page stripes 520, 522, 524, 526, the system 500 is able to improve operational efficiency by taking advantage of the relationship identified as existing between read latency and read heat. In other words, the read latency associated with the pages of a given page type may be used to select the write queue that is assigned thereto based on the corresponding read heat. In doing so, the approaches included herein are able to desirably reduce the overall amount of processing delays experienced by the system 500 as a whole. It follows that typically the number of read heat dependent write queues that are implemented preferably matches the number of page types present in the NAND flash memory blocks.

According to an example, which is in no way intended to limit the invention, open page stripe 520 extends across a number of blocks 530 where all of the pages included in open page stripe 520 are lower pages in QLC memory. Because lower pages are characterized as having a lowest average read latency in comparison to the other types of pages that exist in QLC memory, open page stripe 520 is preferably assigned to a write queue designated for write requests that involve data having higher (e.g., hotter) read heats. Accordingly, the data written in open page stripe 520 will likely experience a high number of read operations, but the lower average read latency which corresponds to the type of pages on which the data is stored will counteract this high number of read operations.

In another example, which is again no way intended to limit the invention, open page stripe 524 extends across a number of blocks where all of the pages included in open page stripe 524 are extra pages in QLC memory. Because extra pages are characterized as having a second highest average read latency in comparison to the other types of pages that exist in QLC memory, open page stripe 524 is preferably assigned to a write queue designated for write requests that involve data having second lowest (e.g., second coldest) read heats. Accordingly, the data written in open page stripe 524 will likely experience a relatively low number of read operations, which will counteract the relatively higher read latency involved with actually conducting a read operation on such pages.

It follows that various ones of the approaches included herein are able to reduce the overall amount of read latency experienced. Again, this is accomplished (at least in part) by correlating select types of physical pages in memory with data having select read heats associated therewith. As a result, this allows for the system to compensate for physical pages in memory having higher read latencies by storing data having lower read heats therein, as well as take advantage of physical pages in memory having lower read latencies by storing data having higher read heats therein.

Figure 5B:
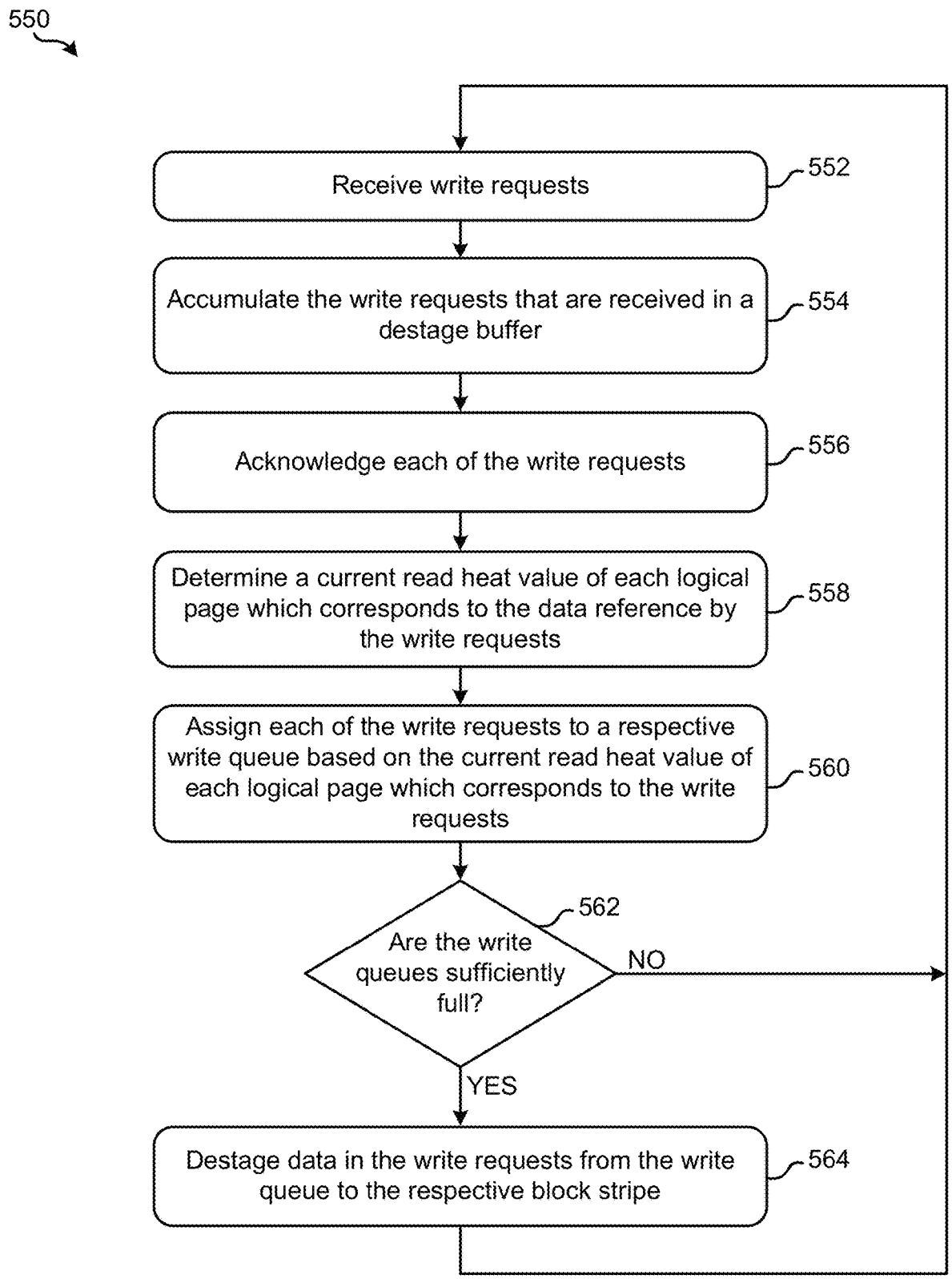
FIG. 5B is a flowchart of a method, in accordance with one approach.

Moreover, looking now to FIG. 5B, a flowchart of a method 550 for storing data in memory according to the aforementioned data storage scheme is shown according to one approach. It should be noted that the processes included in method 550 have been described with respect to the controller architecture introduced in the data storage system 500 of FIG. 5A. In other words, the various processes included in method 550 may be performed by the controller 518 in FIG. 5A in response to receiving write requests, e.g., as will soon become apparent. However, method 550 may be performed in accordance with the present invention in any of the environments depicted in FIGS. 1-4, among others, in various approaches. Of course, more or less operations than those specifically described in FIG. 5B may be included in method 550, as would be understood by one of skill in the art upon reading the present descriptions.

Each of the steps of the method 550 may be performed by any suitable component of the operating environment. For example, in various approaches, the method 550 may be partially or entirely performed by a controller, a processor, a computer, etc., or some other device having one or more processors therein. Thus, in some approaches, method 550 may be a computer-implemented method. In such approaches, the computer used to implement the method may include the non-volatile memory card itself or a portion thereof such as the controller, the non-volatile memory, an external host, a server, etc. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 550. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5B, operation 552 of method 550 includes receiving write requests. In some approaches, new write requests and relocate write requests are received by a read heat separation unit (e.g., see 502 of FIG. 5A). Moreover, depending on the approach, the write requests may be received from one or more hosts, running applications, other data storage systems over a network, etc. Moreover, the write requests which are received are typically either new write requests (also referred to herein as "host write requests") or an internal relocate write requests. As mentioned above, new write requests involve writing new data to memory for a first time, while relocate write requests involve rewriting data that is already stored in memory.

According to an example in the context of the data storage system of FIG. 5A, a relocate write request involves relocating data stored in one or more physical pages of QLC memory 532 to one or more different physical pages of QLC memory 532. However, the relocate write request involves relocating data stored in one or more physical pages of SLC memory to one or more different physical pages of SLC memory in another example (e.g., see method 750 below), or relocating data between one or more physical pages of SLC memory and one or more physical pages of QLC memory in yet another example (e.g., see method 750 below).

Referring back to method 550, the flowchart proceeds to operation 554 which includes accumulating the write requests that are received in a destage buffer. Depending on the approach, the destage buffer may be implemented using MRAM, battery backed DRAM, etc., or any other desired type of memory. Moreover, each of the write requests are acknowledged in operation 556. Depending on the approach, a write request may be acknowledged by returning a message to a source of the write request, indicating that the write request has been added to the destage buffer, updating a LPT, etc.

Operation 558 further includes determining a current read heat value of each logical page which corresponds to the data reference by the write requests. In other words, each of the write requests include and/or correspond to specific portions of data. In approaches involving relocate write requests, the data specified in the write requests corresponds to data that is already stored in memory. Moreover, the logical pages which the data specified in the write requests are stored in have read heats associated therewith (e.g., see read heat counter module 504 in FIG. 5A). Accordingly, operation 558 includes determining a current read heat value that is associated with the data specified in the write requests.

With continued reference to method 550 of FIG. 5B, operation 560 includes assigning each of the write requests to a respective write queue based on the current read heat value of each logical page which corresponds to the write requests. As described above, each of the write queues correspond to a different page type which includes physical pages, and the physical pages included in each of the respective page stripes are of a same type. Accordingly, each of the write queues are paired with a respective type of physical pages in memory. This correlation is preferably established based on a relationship between read heat and read latency. Again, the read latency associated with the type of physical pages in a given page stripe may be used to select the write queue that is assigned thereto based on the corresponding read heat. In doing so, some of the approaches included herein are able to compensate for physical pages in memory having higher read latencies by storing data having lower read heats therein, as well as take advantage of physical pages in memory having lower read latencies by storing data having higher read heats therein. As a result, the approaches are able to desirably reduce the overall amount of processing delays experienced as a whole.

Furthermore, decision 562 includes determining whether any of the write queues include a sufficient number of write requests to fill a respective page stripe in memory which corresponds thereto. When writing to memory, it is desirable that the entire page stripe is filled such that storage capacity is efficiently utilized. However, the process of filling a given page stripe may vary depending on the particular approach. In some approaches decision 562 may involve determining whether any of the write queues include a sufficient number of write requests such that the data included therein is able to fill a predetermined amount of a corresponding page stripe in memory.

For example, decision 562 may involve determining whether any of the write queues include a sufficient number of write requests such that the data included therein would utilize 95% of the storage capacity of a corresponding page stripe in memory when stored therein. While it is preferred that each page stripe is completely filled when written to, write requests from one or more other write queues may be used to fill in a remaining portion of the given page stripe. According to the example above, the remaining 5% of the corresponding page stripe in memory may be filled by write requests accumulated in an adjacent write queue, thereby increasing the efficiency by which the storage capacity is utilized.

If follows that the specific determination made in decision 562 may vary depending on the particular approach. For instance, the write queues 508, 510, 512, 514 may be filled at different rates. However, in a block pages should be programmed in a specific order without skipping any pages in order to achieve efficient performance and reliability. Furthermore, for a given open block stripe, the number pages of each page type is predetermined by the physical architecture of the memory device. Accordingly, rather than waiting for new write requests to accumulate in a given write queue, other options of destaging the data are available. For instance, operation 560 may include placing write requests in suboptimal write queues to better balance the write request queues.

In another example, operation 564 may include repurposing write requests from an adjacent write queue when an insufficient number of write requests remain in the directly associated write queue. According to some approaches, in response to determining a given write queue does not include enough data in the respective write requests to fill the next page stripe which corresponds thereto, a determination is made as to whether an adjacent write queue includes enough data in the respective write requests to complete filling the next page stripe which corresponds to the given write queue. Moreover, the data in the write requests is destaged from the given write queue as well as the adjacent write queue to the next page stripe which corresponds to the given write queue in response to determining that the adjacent write queue includes enough data in the respective write requests to complete filling the next page stripe which corresponds to the given write queue.

Referring still to FIG. 5B, in response to determining that a write queue does not include a sufficient amount of data in the write requests from the write queues to fill the next page stripe in memory, method 550 returns to operation 552 such that additional write requests may be received and processed as described herein. However, in response to determining that a write queue includes a sufficient amount of data in the write requests to fill the next page stripe in memory, method 550 proceeds to operation 564 which includes destaging the data in the write requests from the write queue to the respective page stripe.

Referring momentarily back to FIG. 5A, for a given open block stripe 528 the number of pages of each page type is given by the physical architecture of the non-volatile memory device in some approaches. It is therefore possible that at some point the number of remaining write requests in one of the write queues 508, 510, 512, 514 is not sufficient to write the next page stripe associated therewith, but overall, there are a sufficient number of write requests to write a single page stripe. In this case, operation 564 of FIG. 5B may take write requests from an adjacent write queue or any other write queue when no write requests are left in the directly associated write queue to fill the respective page stripe. To further reduce the risk of experiencing this situation, operation 560 may even sub-optimally place write requests to better balance the queue levels (e.g., by placing the write request in an adjacent write queue or any other write queue when the current write queue exceeds a threshold). It should also be noted that the process of destaging the data in the write requests from the write queue involves actually performing a write operation. In other words, the act of destaging the data in the write requests from the write queue involves (or at least triggers) the data actually being written to the physical pages in memory, e.g., as would be appreciated by one skilled in the art after reading the present description.

From operation 564, method 550 also returns to operation 552 such that additional write requests may be received and processed as described herein. It follows that subsequent requests to perform write requests may be received before a current destage operation has been successfully implemented, which are preferably received and processed, e.g., according to method 550.

Figure 5C:
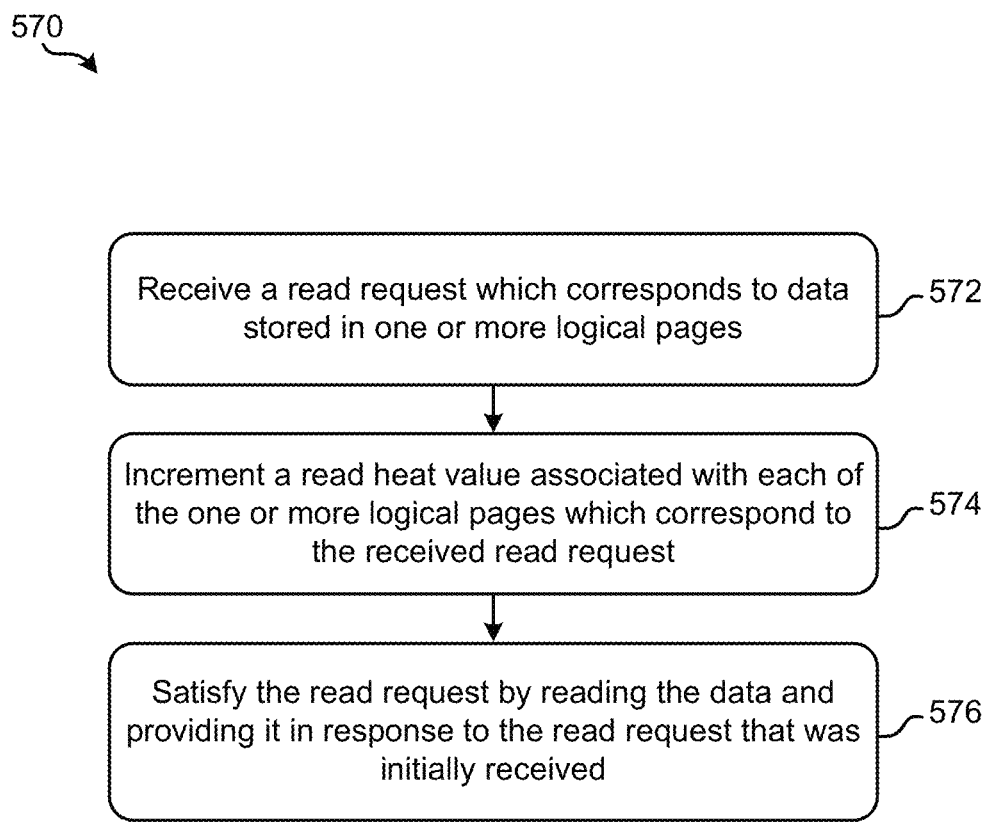
FIG. 5C is a flowchart of a method, in accordance with one approach.

Similarly, read operation requests may be received at any time, e.g., while a write request is being processed and/or a write operation itself is being performed. FIG. 5C illustrates a method 570 for evaluating a read request that has been received, in accordance with one approach. It should be noted that the method 570 has also been described with respect to the controller architecture introduced in the data storage system 500 of FIG. 5A. In other words, the various processes included in method 570 may be performed by the controller 518 in FIG. 5A in response to receiving read requests, e.g., as will soon become apparent. However, method 570 may be performed in accordance with the present invention in any of the environments depicted in FIGS. 1-4, among others, in various approaches. Of course, more or less operations than those specifically described in FIG. 5C may be included in method 570, as would be understood by one of skill in the art upon reading the present descriptions.

Each of the steps of the method 570 may be performed by any suitable component of the operating environment. For example, in various approaches, the method 570 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 570. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5C, operation 572 of method 570 includes receiving a read request which corresponds to data stored in one or more logical pages. A read request may be received from a host (e.g., user), a running application, another storage system, etc., depending on the approach. Moreover, operation 574 includes incrementing a read heat value associated with each of the one or more logical pages which correspond to the received read request. As mentioned above, each of the logical pages preferably have a read heat value corresponding thereto. Referring momentarily back to FIG. 5A, read heat counter module 504 is responsible in some approaches for maintaining a current read heat value for each logical page in memory. In alternative approaches the counter module 504 may maintain a single counter for a contiguous range of logical pages.

Depending on the approach, read heat values may be managed at the logical level and/or the physical level. For instance, a LPT may include one or more bits for each logical page indicated therein, where the bits maintain the current read heat value for the respective logical page. According to an example, which is in no way intended to limit the invention, a 2-bit counter is implemented for each logical block address. Each of the 2-bit counters are incremented from a value of 0 to a value of 1 in response to receiving a read request which corresponds to the data stored therein. Moreover, each of the 2-bit counters are incremented from a value of 1 to a value of 2 according to a predetermined probability. For instance, a given 2-bit counter has a probability of 1/10 (10%) that it will be increased from a value of 1 to a value of 2 in response to receiving a read request which corresponds to the data stored therein. Similarly, each of the 2-bit counters are incremented from a value of 2 to a value of 3 according to another predetermined probability. For instance, a given 2-bit counter has a probability of 1/100 (1%) that it will be increased from a value of 2 to a value of 3 in response to receiving a read request which corresponds to the data stored therein. Thus, each 2-bit counter is able to maintain an accurate read heat for the data which corresponds thereto without significantly increasing the amount of metadata stored by the system.

It also follows that in some approaches, the read heat counter module 504 has access to a LPT in order to maintain the read heat values for the logical pages based on the data that is actually included in the physical pages which correspond thereto. A range of adjacent logical block addresses may even be aggregated in some approaches to increase counter resolution. However, it should be noted that in such situations the value of each counter should not be reset upon experiencing an overwrite of the respective page. Rather, counter values may be periodically decremented in the background, e.g., according to a predetermined counter management scheme. Other factors may also be considered in determining whether the read heat values should be reset upon performing a host write request. These additional factors include, by are in no way limited to, detected workload priorities, storage system architecture (e.g., knowing that a log structured array is implemented), whether periodically aging the read heat information is a viable option, etc.

With respect to approaches which implement read heat values which are managed at the physical level, counters may be applied in a number of different ways. For instance, a high resolution counter may be maintained for each page type and block in physical memory. In other words, 4 counters are implemented for each QLC memory block. In other situations, a high resolution counter is maintained for each page type, layer, and block. In still other situations, a low resolution counter may be implemented for each fine granular page group of each block. It follows that read heat values which are managed by counters at the physical level could be used to improve detection of data misplacements. The detection of data misplacement can be leveraged at operation 560 where write requests are assigned to write queues or used by a garbage collector (e.g., see 304 of FIG. 3) to relocate such misplaced data.

In still further approaches, any of the counters used to maintain the current read heat values may be any desired type of saturating counters. The read heat counters may also be used to filter sequential scans (e.g., such as internal mitigation read operations, array-level scrubbing, etc.) and/or calibration reads, e.g., as would be appreciated by one skilled in the art after reading the present description. By filtering sequential scans and/or calibration reads, the read heat counters are able to avoid read counter values from increasing unintentionally. Further still, in some approaches, counters may be implemented on both the logical and physical page levels, and can even be combined, e.g., as desired.

Referring again to FIG. 5C, method 570 also includes satisfying the read request by reading the data and providing it in response to the read request that was initially received. See operation 576. For example, the initial read request may have been received from a host whereby the data read from memory is provided (e.g., sent) to the host that issued the read request.

It follows that the various processes included in methods 550 and 570 are able to leverage the different latency properties of the different types of physical pages in multi-bit-per-cell memory (e.g., such as MLC, TLC and QLC NAND Flash) to significantly reduce the read latency experienced by the overarching data storage system as a whole. These improvements are achieved in some approaches by tracking the read heat of the data stored in memory, and selectively organizing the data in memory according to the read heat, e.g., according to any of the approaches above.

Figure 6A:
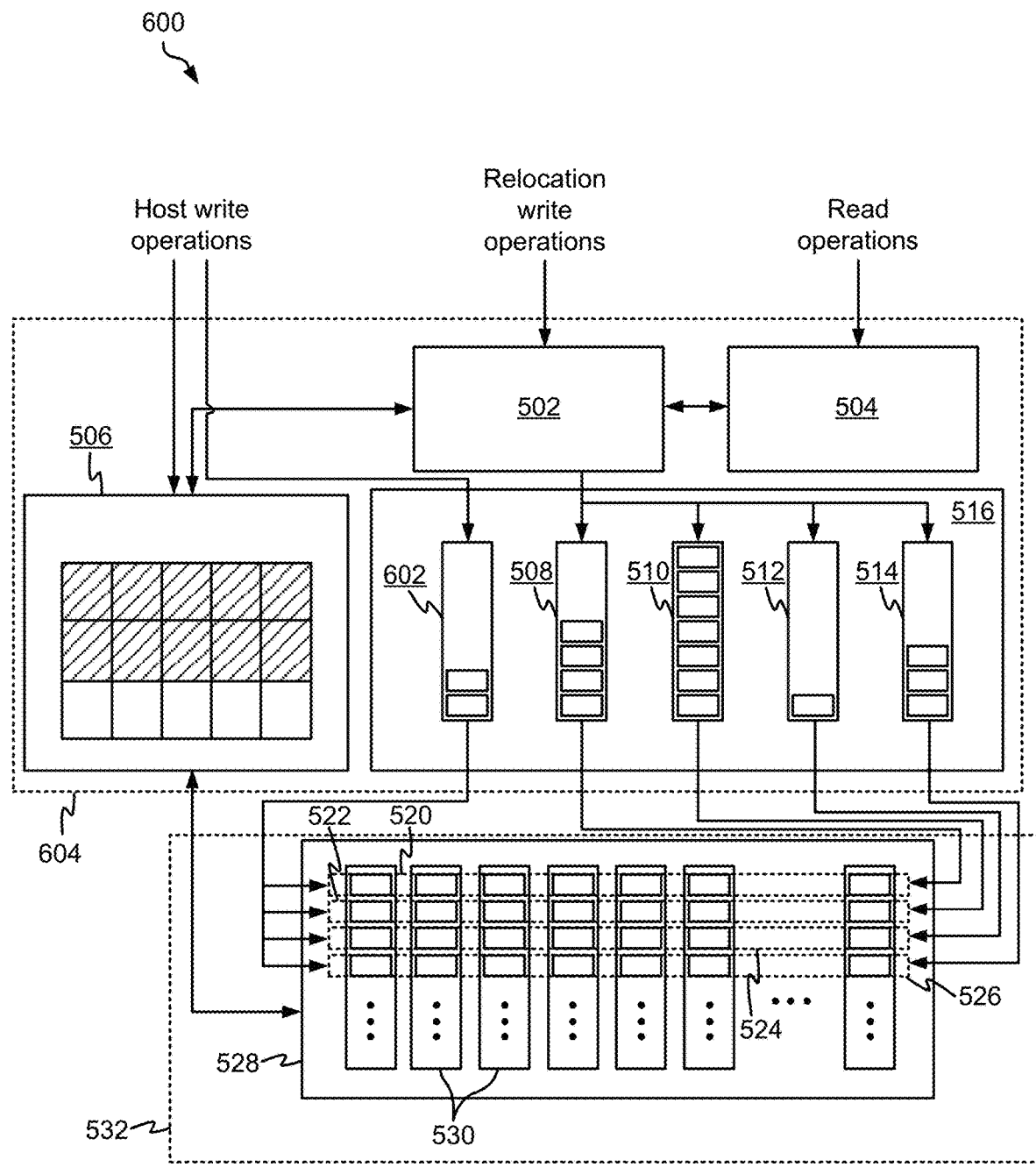
FIG. 6A is a partial representational view of a data storage system, in accordance with one approach.

Looking now to FIG. 6A, a data storage system 600 which implements a controller architecture which is similar to that illustrated in FIG. 5A above is depicted in accordance with one approach. Specifically, FIG. 6A illustrates variations of the approach of FIG. 5A depicting several exemplary configurations within the data storage system 600. Accordingly, various components of FIG. 6A have common numbering with those of FIG. 5A.

As an option, the present data storage system 600 may be implemented in conjunction with features from any other approaches listed herein, such as those described with reference to the other FIGS., such as FIGS. 1-5A. However, such data storage system 600 and others presented herein may be used in various applications and/or in permutations which may or may not be specifically described in the illustrative approaches listed herein. Further, the data storage system 600 presented herein may be used in any desired environment. Thus FIG. 6A (and the other FIGS.) may be deemed to include any possible permutation.

As shown, host write requests that are received by the data storage system 600 are routed directly into the destage buffer 506 rather than being received by the read heat separation unit 502 as shown in FIG. 5A. This difference in the way host write requests are handled by the controller 604 in this approach stems from the fact that host write requests involve data which does not yet exist in memory (e.g., new data or overwritten data), and therefore does not have a read heat associated therewith. While a read heat counter may be established in the read heat counter module 504 for each host write request received, read heat does not play a role in determining where the data in the host write requests is ultimately stored in memory. Rather, host write requests are accumulated in a supplemental write queue 602. It follows that the supplemental write queue 602 is designated to only store host write requests, which are then used to fill any gaps in the block stripes that the other write queues may not have been able to, e.g., as indicated by the arrows in FIG. 6A and as will soon become apparent.

Figure 6B:
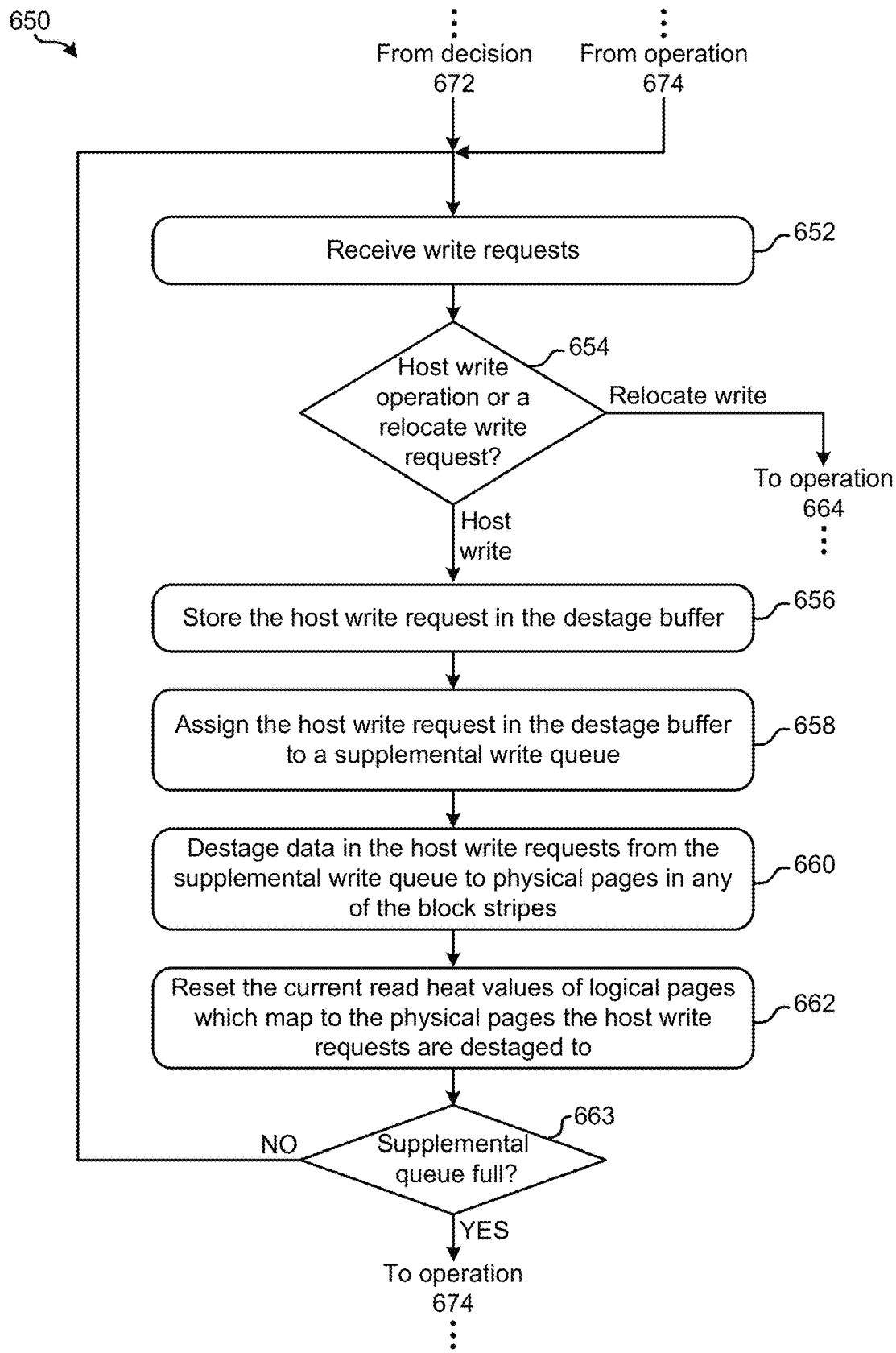
FIG. 6B is a flowchart of a method, in accordance with one approach.
Figure 6B:
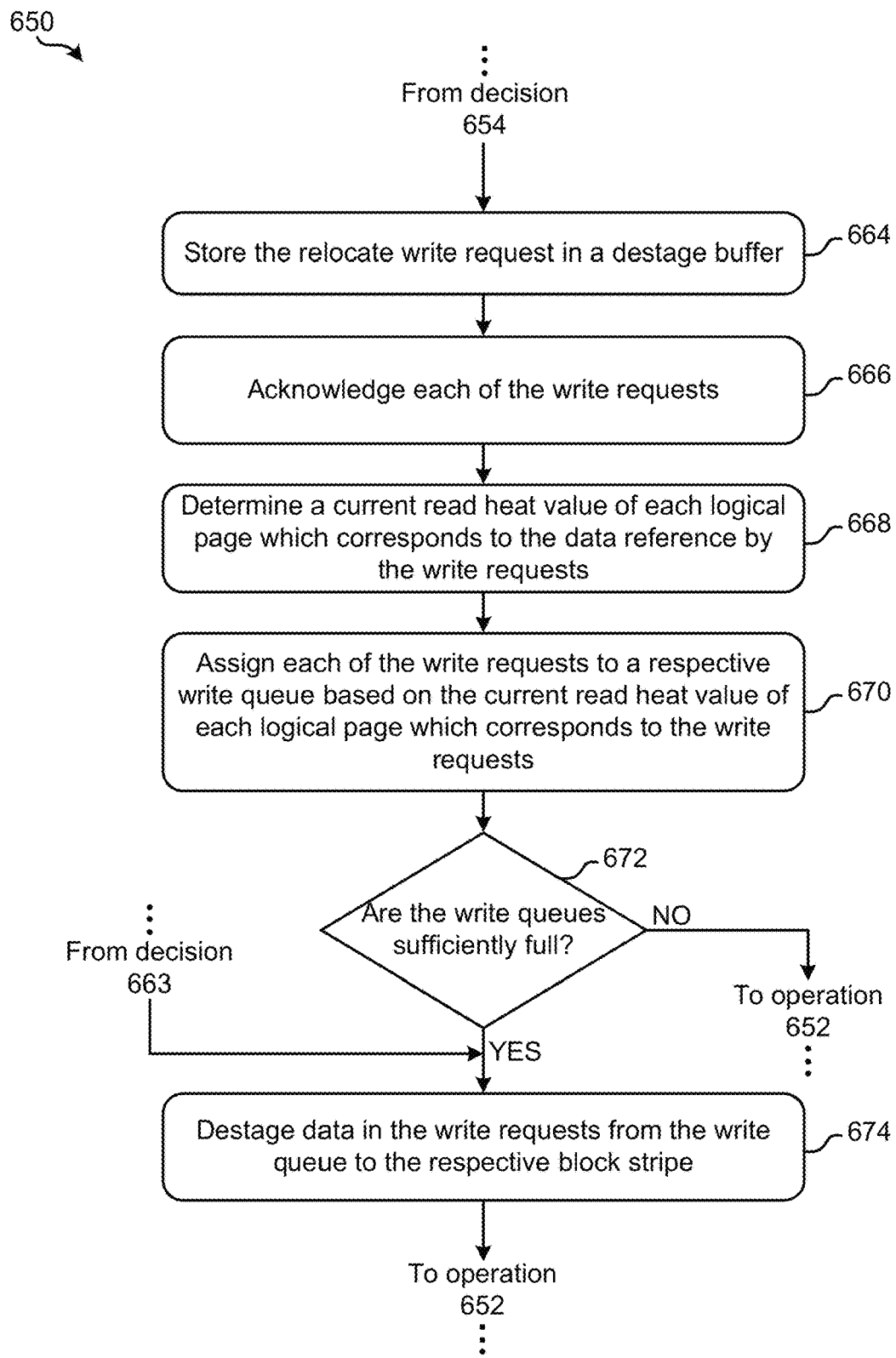

Looking now to FIG. 6B, a flowchart of a method 650 for storing data in memory according to the aforementioned data storage scheme is shown according to one approach. It should be noted that the processes included in method 650 have been described with respect to the controller architecture introduced in the data storage system 600 of FIG. 6A. In other words, the various processes included in method 650 may be performed by the controller 604 in FIG. 6A in response to receiving write requests, e.g., as will soon become apparent. However, method 650 may be performed in accordance with the present invention in any of the environments depicted in FIGS. 1-5A, among others, in various approaches. Of course, more or less operations than those specifically described in FIG. 6B may be included in method 650, as would be understood by one of skill in the art upon reading the present descriptions.

Each of the steps of the method 650 may be performed by any suitable component of the operating environment. For example, in various approaches, the method 650 may be partially or entirely performed by a controller, a processor, a computer, etc., or some other device having one or more processors therein. Thus, in some approaches, method 650 may be a computer-implemented method. In such approaches, the computer used to implement the method may include the non-volatile memory drive itself or a portion thereof such as the controller, the non-volatile memory, an external host, a server, etc. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 650. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6B, operation 652 of method 650 includes receiving write requests. In some approaches, new write requests and relocate write requests are received. Accordingly, decision 654 includes determining whether each write request is a host write request or a relocate write request. As mentioned above, new write requests involve writing new data to memory for a first time, while relocate write requests involve rewriting data that is already stored in memory.

In response to determining that a given write request is a host write request, method 650 proceeds to operation 656 which includes storing the host write request in the destage buffer, e.g., according to any of the approaches described above. Moreover, operation 658 includes assigning the host write request in the destage buffer to a supplemental write queue. As noted above, the supplemental write queue (e.g., see 602 in FIG. 6A) is only used to accumulate host write requests in preferred approaches.

Moreover, operation 660 includes destaging the data in the host write requests from the supplemental write queue to physical pages in any of the block stripes. As noted above, the data included in host write requests are preferably used to fill any gaps that the other write queues may not have been able to. Accordingly, the data in the host write requests may be destaged from the supplemental write queue as desired, e.g., rather than in response to determining that the queue has been sufficiently filled.

Further still, method 650 includes resetting the current read heat values of logical pages which map to the physical pages the data in the host write requests are destaged to. See operation 662. As noted above, host write requests include data which has not yet been stored in memory, and therefore does not have a read heat associated therewith. It follows that when the data in a host write request is stored in one or more pages of memory, any previous read heat value associated with the one or more pages that have been overwritten no longer accurately represent the read heat of the data stored therein now. By resetting the current read heat value of logical pages which map to the physical pages the data in the host write requests are destaged to, the host write requests are able to begin tracking an accurate read heat value, e.g., as would be appreciated by one skilled in the art after reading the present description. This is typically the case when read hot and write hot data sets are substantially different (there is little overlap therebetween) and/or a log structured array is implemented, e.g., as would be appreciated by one skilled in the art after reading the present description. However, it should be noted that if the read hot and write hot data sets do have a substantial amount of overlap, read heat values may not be reset in response to performing a host write. Rather, the read heat values may be decremented over time, e.g., according to any type of predetermined scheme.

From operation 662, method 650 proceeds to operation 663 where it is determined if the supplemental write queue is sufficiently full. If it is determined that the supplemental write queue is sufficiently full, method 650 jumps to operation 674, otherwise method 650 returns to operation 652 such that additional write requests may be received and processed as described herein. It follows that subsequent requests to perform write requests may be received before a current destage operation has been successfully implemented, which are preferably received and processed, e.g., according to method 650.

Returning to decision 654, method 650 proceeds to operation 664 in response to determining that a given write request is a relocate write request. There, operation 664 includes storing the relocate write request in a destage buffer. In other words, the relocate write request is assigned to the destage buffer. As noted above, depending on the approach, the destage buffer may be implemented using MRAM, battery backed DRAM, etc., or any other desired type of memory. Moreover, each of the write requests are acknowledged in operation 666. Depending on the approach, a write request may be acknowledged by returning a message to a source of the write request, indicating that the write request has been added to the destage buffer, updating a LPT, etc.

Operation 668 includes determining a current read heat value of each logical page which corresponds to the data reference by the write requests. Moreover, operation 670 includes assigning each of the write requests to a respective write queue based on the current read heat value of each logical page which corresponds to the write requests. This may be achieved according to any of the approaches described above with respect to operation 560 of method 550. For instance, read heat values may be managed at the logical level (e.g., in an LPT) and/or the physical level.

Referring still to FIG. 6B, decision 672 includes determining whether any of the write queues include a sufficient amount of data in the write requests to fill a respective page stripe in memory which corresponds thereto. When writing to memory, it is desirable that the entire page stripe is filled such that storage capacity is efficiently utilized. Although it is preferred that each page stripe is completely filled when written to, in some approaches decision 672 may involve determining whether any of the write queues include a sufficient amount of data in the write requests to fill a predetermined amount of a corresponding page stripe in memory. For example, decision 672 may involve determining whether any of the write queues include a sufficient number of write requests such that the data included therein is able to utilize 95% of the storage capacity of a corresponding block stripe in memory. In this example, the data in the host write requests that have accumulated in a supplemental write queue may be used to fill the remaining 5% of the corresponding block stripe in memory, thereby increasing the efficiency by which the storage capacity is utilized. Alternatively, write requests from an adjacent write queue or any other write queue may be used to fill in the remaining memory as well, e.g., as described above.

In response to determining that a write queue does not include a sufficient amount of data in the write requests from the write queues to fill the next page stripe in memory, method 650 may decide to take write requests from an adjacent write queue or any other write queue when no write requests are left in the directly associated write queue to fill the respective page stripe, but there are still enough write requests to fill a page stripe before returning to operation 652 such that additional write requests may be received and processed as described herein. However, in response to determining that a write queue includes a sufficient amount of data in the write requests to fill a respective page stripe in memory, method 650 proceeds to operation 674 which includes destaging the data in the write requests from the write queue to the respective page stripe. From operation 674, method 650 also returns to operation 652 such that additional write requests may be received and processed as described herein. It follows that subsequent requests to perform write requests may be received before a current destage operation has been successfully implemented, which are preferably received and processed, e.g., according to method 650.

It follows that the various processes included in method 650 are able to leverage the different latency properties of the different types of physical pages in multi-bit-per-cell memory (e.g., such as TLC and QLC NAND Flash) to significantly reduce the read latency experienced by the overarching data storage system as a whole. These improvements are achieved in some approaches by tracking the read heat of the data stored in memory, and selectively organizing the data in memory according to the read heat, e.g., according to any of the approaches above.

Figure 7A:
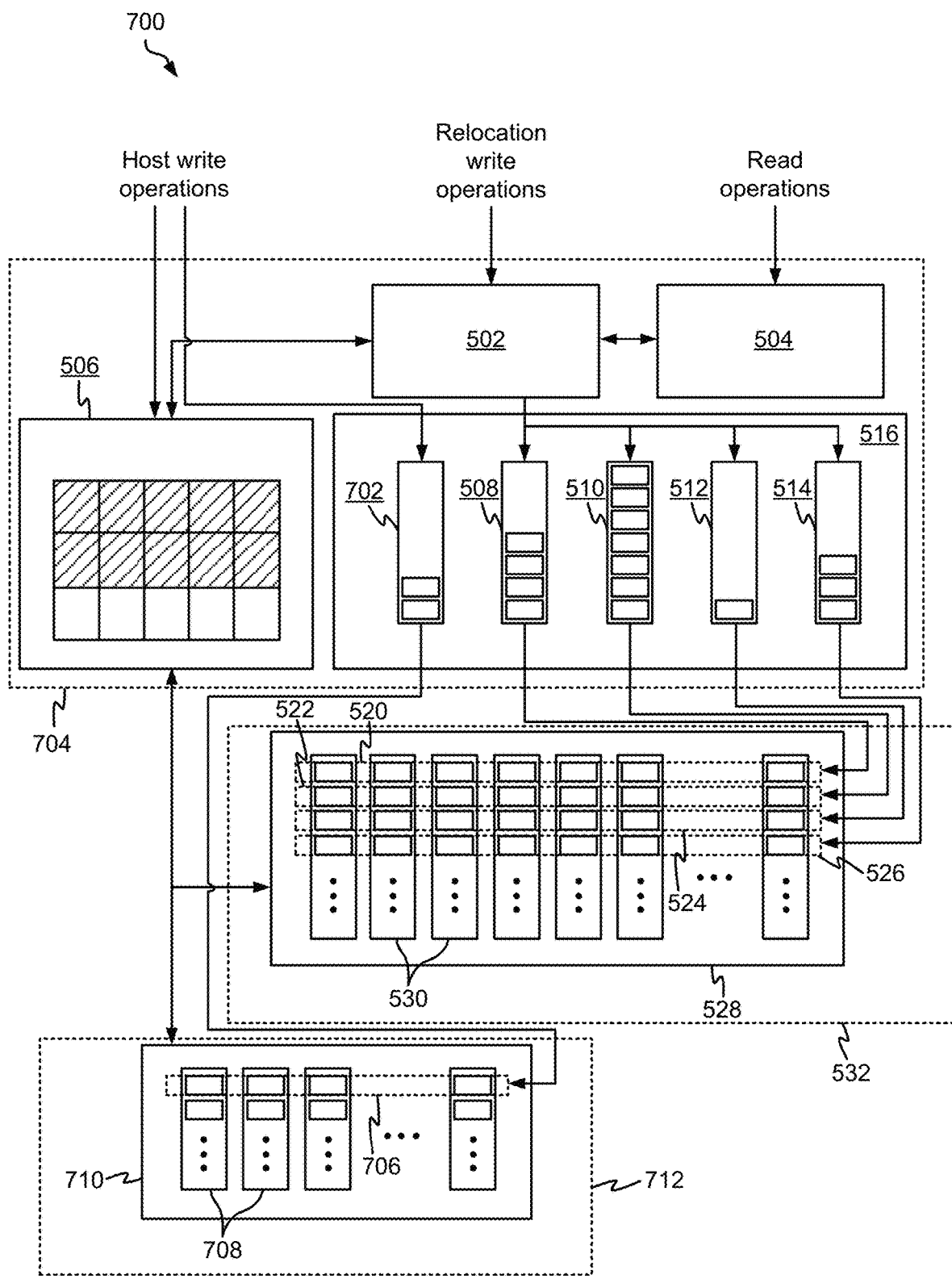
FIG. 7A is a partial representational view of a data storage system, in accordance with one approach.

Looking now to FIG. 7A, a data storage system 700 which implements a controller architecture which is similar to that illustrated in FIGS. 5A and 6A above is depicted in accordance with another approach. Specifically, FIG. 7A illustrates variations of the approaches of FIGS. 5A and 6A depicting several exemplary configurations within the data storage system 700. Accordingly, various components of FIG. 7A have common numbering with those of FIGS. 5A and 6A.

As an option, the present data storage system 700 may be implemented in conjunction with features from any other approaches listed herein, such as those described with reference to the other FIGS., such as FIGS. 1-4. However, such data storage system 700 and others presented herein may be used in various applications and/or in permutations which may or may not be specifically described in the illustrative approaches listed herein. Further, the data storage system 700 presented herein may be used in any desired environment. Thus FIG. 7A (and the other FIGS.) may be deemed to include any possible permutation.

As shown, host write requests that are received by the data storage system 700 are routed directly into the destage buffer 506 rather than being received by the read heat separation unit 502. This difference in the way host write requests are handled by a hybrid controller 704 architecture in this approach stems from the fact that host write requests involve data which does not yet exist in memory, and therefore does not have a read heat associated therewith. While a read heat counter may be established in the read heat counter module 504 for each host write request received, read heat does not play a role in determining where the data in the host write requests is ultimately stored in memory. Rather, host write requests are accumulated in a supplemental write queue 702. It follows that the supplemental write queue 702 is designated to only store host write requests, which are then used to fill page stripes 706 in open block stripe 710 which extend across memory blocks 708 in SLC memory 712, e.g., as indicated by the arrows in FIG. 7A and as will soon become apparent. It should also be noted that read operations which request data that is stored in SLC memory 712 has a lowest latency in comparison to read operations performed on multi-bit-per-cell memory 528, e.g., such as QLC memory.

Figure 7B:
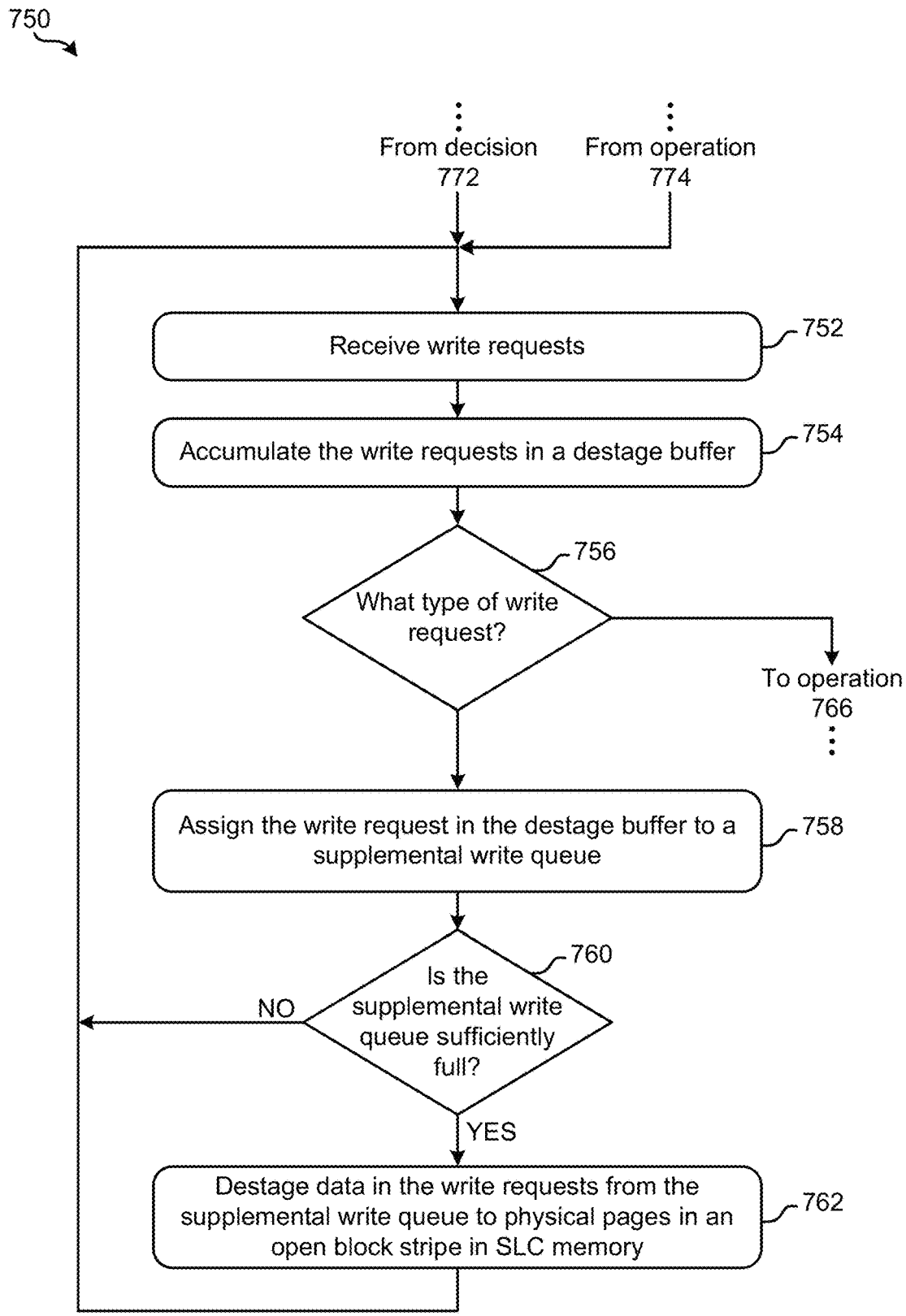
FIG. 7B is a flowchart of a method, in accordance with one approach.
Figure 7B:
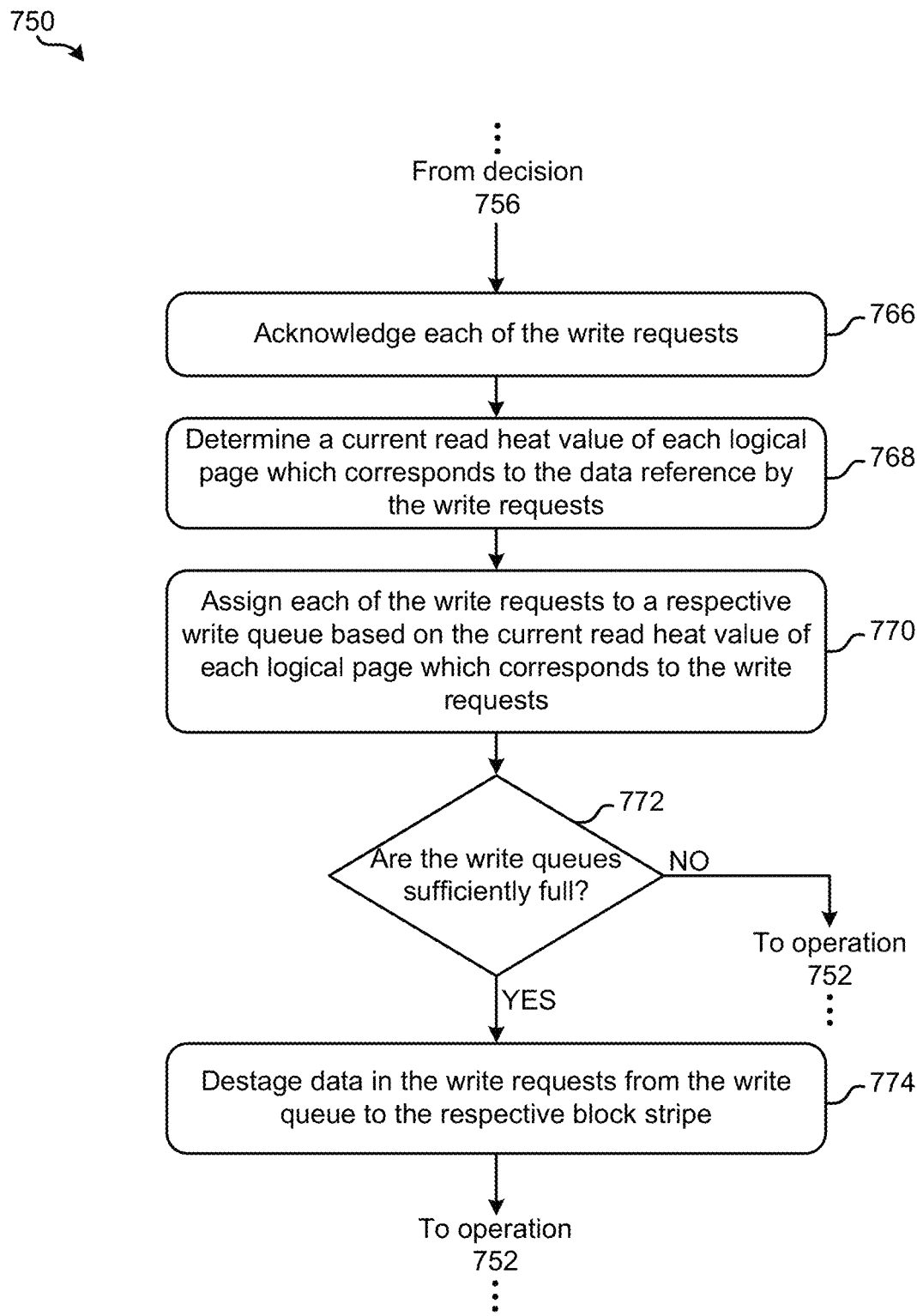

Looking now to FIG. 7B, a flowchart of a method 750 for storing data in memory according to the aforementioned data storage scheme is shown according to one approach. It should be noted that the processes included in method 750 have been described with respect to the hybrid controller architecture introduced in the data storage system 700 of FIG. 7A. In other words, the various processes included in method 750 may be performed by the controller 704 in FIG. 7A in response to receiving write requests, e.g., as will soon become apparent. However, method 750 may be performed in accordance with the present invention in any of the environments depicted in FIGS. 1-5A, among others, in various approaches. Of course, more or less operations than those specifically described in FIG. 7B may be included in method 750, as would be understood by one of skill in the art upon reading the present descriptions.

Each of the steps of the method 750 may be performed by any suitable component of the operating environment. For example, in various approaches, the method 750 may be partially or entirely performed by a controller, a processor, a computer, etc., or some other device having one or more processors therein. Thus, in some approaches, method 750 may be a computer-implemented method. In such approaches, the computer used to implement the method may include the tape drive itself or a portion thereof such as the controller, the tape, an external host, a server, etc. Moreover, the terms computer, processor and controller may be used interchangeably with regards to any of the approaches herein, such components being considered equivalents in the many various permutations of the present invention.

Moreover, for those approaches having a processor, the processor, e.g., processing circuit(s), chip(s), and/or module(s) implemented in hardware and/or software, and preferably having at least one hardware component may be utilized in any device to perform one or more steps of the method 750. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7B, operation 752 of method 750 includes receiving write requests, while operation 754 includes accumulating the write requests in a destage buffer. It should also be noted that accumulating the write requests in the destage buffer may include any of the same or similar approaches as described above with respect to storing write requests in a destage buffer, as the terms "accumulating" and "storing" are in no way intended to limit the invention.

Depending on the approach, new write requests and/or relocate write requests may be received. Further still, the relocate write requests may involve relocating data between blocks in SLC memory, between blocks in multi-bit-per-cell memory, and/or between SLC and multi-bit-per-cell memory. Accordingly, decision 756 includes determining what type each of the write requests are.

In response to determining that a given write request is a host write request or a relocate write request which involves relocating data between different blocks in SLC memory, method 750 proceeds to operation 758 which includes assigning the write request in the destage buffer to a supplemental write queue. As noted above, the supplemental write queue (e.g., see 702 in FIG. 7A) is only used to accumulate host write requests and relocate write request which involves relocating data between blocks in SLC memory in preferred approaches.

Decision 760 includes determining whether the supplemental write queue include a sufficient amount of data in the write requests to fill at least an open page stripe in SLC memory. When writing to memory, it is desirable that the entire page stripe is filled such that storage capacity is efficiently utilized. Although it is preferred that each page stripe is completely filled when written to, in some approaches decision 760 may involve determining whether the supplemental write queue includes a sufficient amount of data in the write requests to fill a predetermined amount of an open page stripe in SLC memory, e.g., as described in the approaches above.

In response to determining that the supplemental write queue does not include a sufficient amount of data in the write requests to fill an open page stripe in SLC memory, method 750 returns to operation 752 such that additional write requests may be received and processed as described herein. However, in response to determining that the supplemental write queue does include a sufficient amount of data in the write requests to fill an open page stripe in SLC memory, method 750 proceeds to operation 762. There, operation 762 includes destaging the data in the write requests from the supplemental write queue to physical pages in an open block stripe in SLC memory. Further still, the current read heat values of logical pages which map to the physical pages that the data in the host write requests are destaged to are preferably reset as described above.

From operation 762, method 750 returns to operation 752 such that additional write requests may be received and processed as described herein. It follows that subsequent requests to perform write requests may be received before a current destage operation has been successfully implemented, which are preferably received and processed, e.g., according to method 750.

Returning to decision 756, method 750 proceeds to operation 766 in response to determining that a given write request is a relocate write request which involves relocating data between blocks in multi-bit-per-cell memory and/or relocating data from blocks in SLC to blocks in multi-bit-per-cell. Although the multi-bit-per-cell memory may be 3D QLC memory in some approaches, any type of multi-bit-per-cell memory may be implemented in any of the approaches described herein. As shown, operation 766 includes acknowledging each of the write requests. Depending on the approach, a write request may be acknowledged by returning a message to a source of the write request, indicating that the write request has been added to the destage buffer, updating a LPT, etc.

Operation 768 further includes determining a current read heat value of each logical page which corresponds to the data reference by the write requests. Moreover, operation 770 includes assigning each of the write requests to a respective write queue based on the current read heat value of each logical page which corresponds to the write requests. This may be achieved according to any of the approaches described above with respect to operation 560 of method 550. For instance, read heat values may be managed at the logical level (e.g., in an LPT) and/or the physical level. Optionally, operation 770 may further take into account the queue levels of the write queues (e.g., see 508, 510, 512, 514 of FIG. 7A) to better balance the write queue levels. For instance, operation 770 may include placing the write requests in an adjacent write queue or any other write queue when the current write queue exceeds a predetermined threshold.

Referring still to FIG. 7B, decision 772 includes determining whether the write queues include a sufficient amount of data in the write requests to fill the next page stripe in memory which corresponds thereto. When writing to memory, it is desirable that the entire page stripe is filled such that storage capacity is efficiently utilized. Although it is preferred that each page stripe is completely filled when written to, in some approaches decision 772 may involve determining whether any of the write queues include a sufficient amount of data in the write requests to fill a predetermined amount of a corresponding page stripe in memory. For example, decision 772 may involve determining whether any of the write queues include a sufficient amount of data in the write requests to utilize 95% of the storage capacity of a corresponding block stripe in memory. In this example, data in the host write requests that have accumulated in a supplemental write queue may be used to fill the remaining 5% of the corresponding page stripe in memory, thereby increasing the efficiency by which the storage capacity is utilized. Alternatively, write requests from an adjacent write queue or any other write queue may be used to fill in the remaining memory as well.

In response to determining that a write queue does not include a sufficient amount of data in the write requests to fill the next page stripe in memory, method 750 returns to operation 752 such that additional write requests may be received and processed as described herein. However, in response to determining that a write queue includes a sufficient amount of data in the write requests to fill a respective page stripe in memory, method 750 proceeds to operation 774 which includes destaging the data in the write requests from the write queue to the respective page stripe. From operation 774, method 750 also returns to operation 752 such that additional write requests may be received and processed as described herein. It follows that subsequent requests to perform write requests may be received before a current destage operation has been successfully implemented, which are preferably received and processed, e.g., according to method 750.

It follows that the various processes included in method 750 are also able to leverage the different latency properties of the different types of physical pages in multi-bit-per-cell memory (e.g., such as TLC and QLC NAND Flash) to significantly reduce the read latency experienced by the overarching data storage system as a whole. These improvements are achieved in some approaches by tracking the read heat of the data stored in memory, and selectively organizing the data in memory according to the read heat, e.g., according to any of the approaches above.

Furthermore, various ones of the approaches included herein are able to leverage the different latency properties of the different types of physical pages in multi-bit-per-cell memory (e.g., such as TLC and QLC NAND Flash) to significantly reduce the read latency experienced by the overarching data storage system as a whole. These improvements are achieved in some approaches by tracking the read heat of the data stored in memory, and selectively organizing the data in memory according to the read heat, e.g., according to any of the approaches above. For instance, data that is frequently read is selectively stored on physical pages that have a lower intrinsic read latency, while data that is infrequently read is selectively stored on physical pages with a higher intrinsic read latency. As a result, the overall read latency experienced by the data storage system is reduced significantly, thereby increasing efficiency.

Moreover, systems which implement a hybrid controller architecture having blocks of memory operating in SLC and multi-bit-per-cell mode in the same device is able to achieve improved read latencies from the beginning of operation. This is because the blocks of memory operating in SLC mode have a significantly low read latency associated therewith and are used to field host write requests and other types of write requests which do not have read heat information available. Moreover, data that has been misplaced in the storage system may be detected in the various approaches described herein. In response to making such a detection, the data may be proactively relocated (e.g., with or without resetting the corresponding read heat value) by relocating the misplaced pages themselves, or even the entire block or LEB in some situations.

It should also be noted that while various ones of the approaches included herein are able to significantly reduce read latency experienced by a given storage system, additional steps may be taken to further reduce read latency. For example, orthogonal techniques such as data compression, horizontal lane straddling, snap reads (e.g., reading partial physical pages), etc. may be implemented in any of the approaches herein to further reduce read latency, e.g., in any manner which would be apparent to one skilled in the art after reading the present description.

Moreover, although various ones of the approaches are described herein as correlating each page stripe with a specific write queue, this is in no way intended to limit the invention. For instance, a write queue which includes write requests corresponding to data having a given read heat may be used to fill a page stripe which is correlated with a write queue which includes write requests corresponding to data having a similar read heat. According to an example, a write queue which includes write requests corresponding to data having a hot read heat may be used to fill a page stripe which is correlated with a write queue which includes write requests corresponding to data having a warm read heat. This operational scheme may be implemented in order to free space in the destage buffer, flush a write queue that is close to becoming full, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 8:
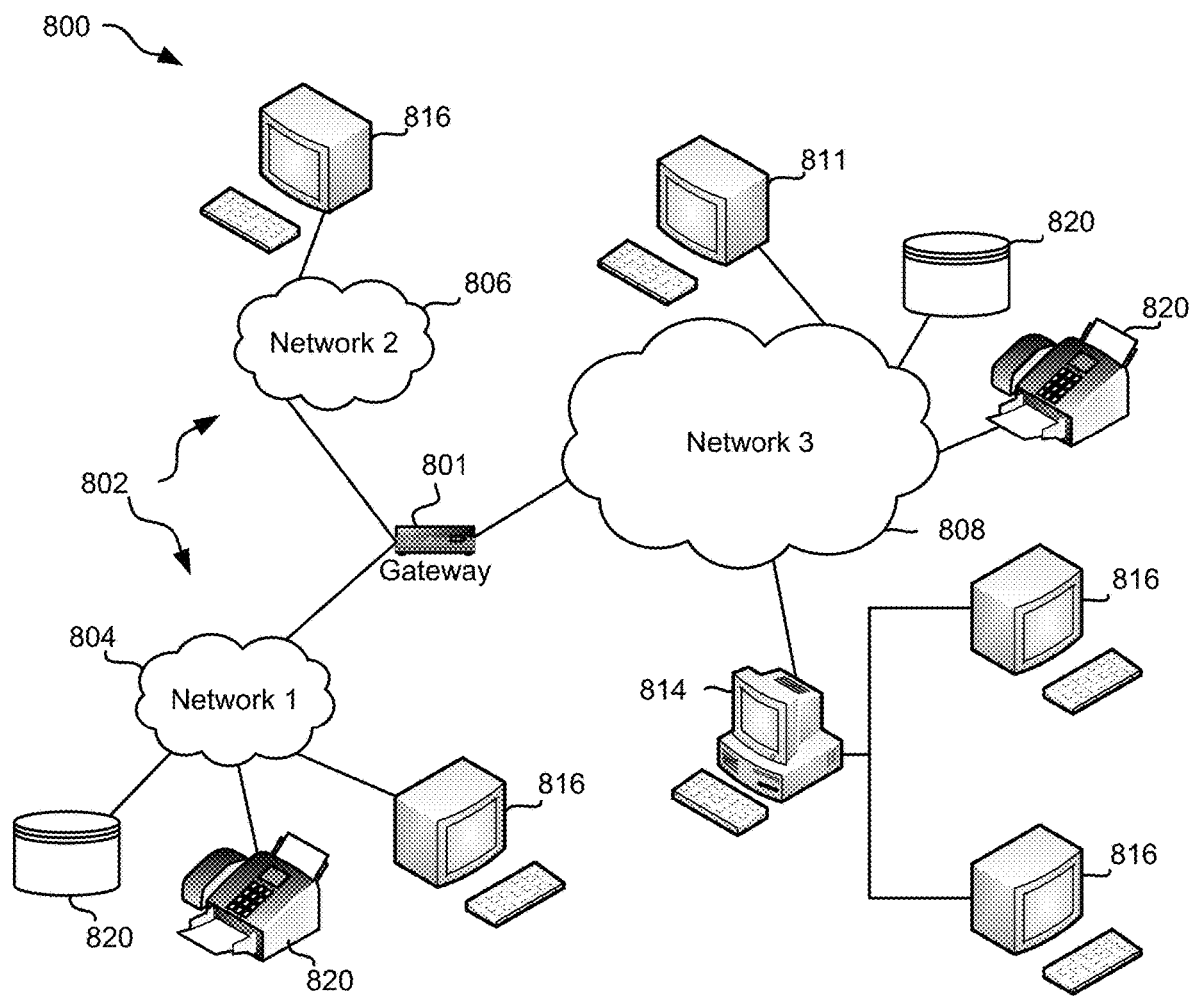
FIG. 8 is a network architecture, in accordance with one approach.

FIG. 8 illustrates a network architecture 800, in accordance with one approach. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some approaches.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some approaches, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some approaches.

In other approaches, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
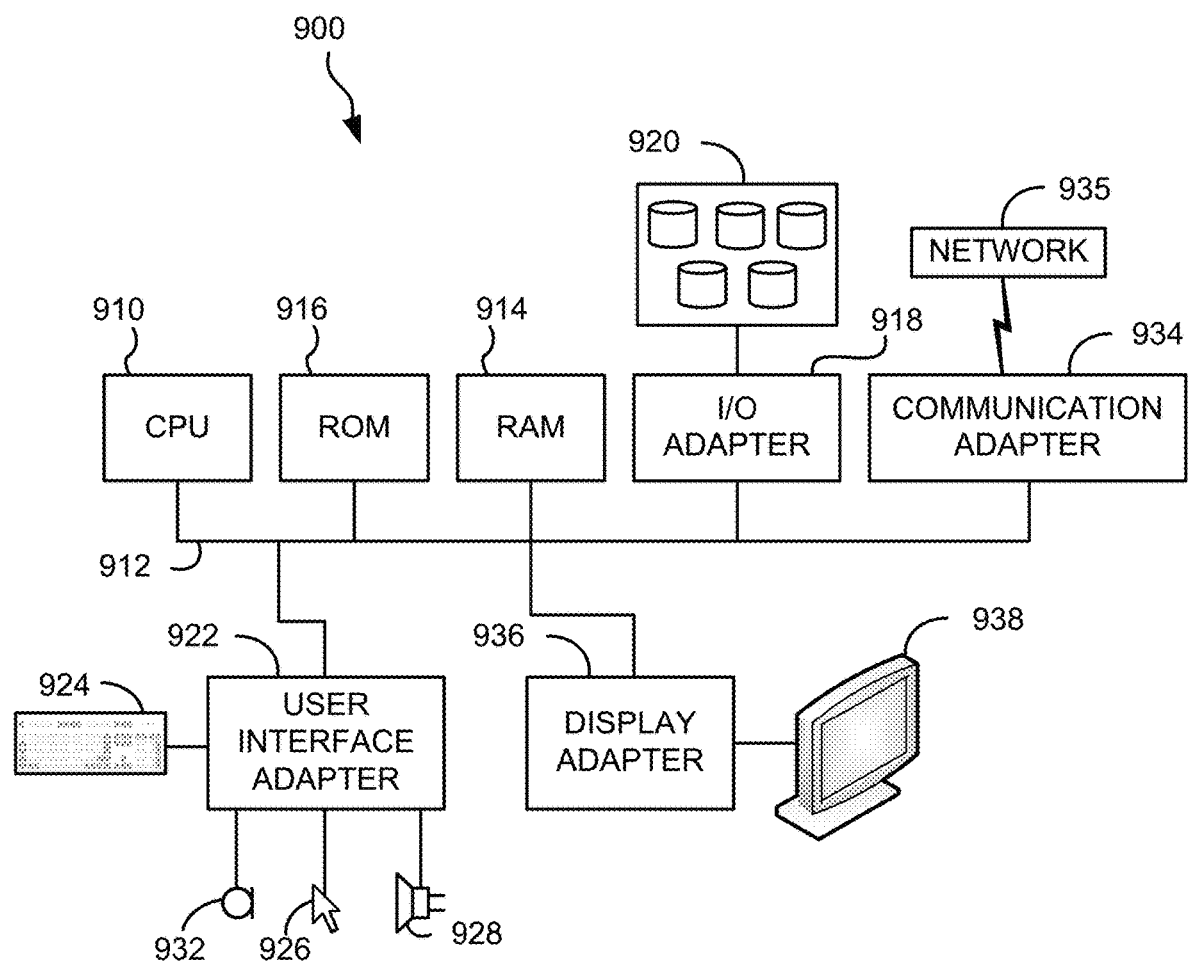
FIG. 9 is a representative hardware environment that may be associated with the servers and/or clients of FIG. 8, in accordance with one approach.

FIG. 9 shows a representative hardware environment associated with a user device 816 and/or server 814 of FIG. 8, in accordance with one approach. FIG. 9 illustrates a typical hardware configuration of a processor system 900 having a central processing unit 910, such as a microprocessor, and a number of other units interconnected via a system bus 912, according to one approach. In some approaches, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some approaches, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some approaches, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred approach may also be implemented on platforms and operating systems other than those mentioned. A preferred approach may be written using JAVA, XML, C, and/or C++ language, or other programming languages, along with an object oriented programming methodology. Object oriented programming (OOP), which has become increasingly used to develop complex applications, may be used.

Figure 10:
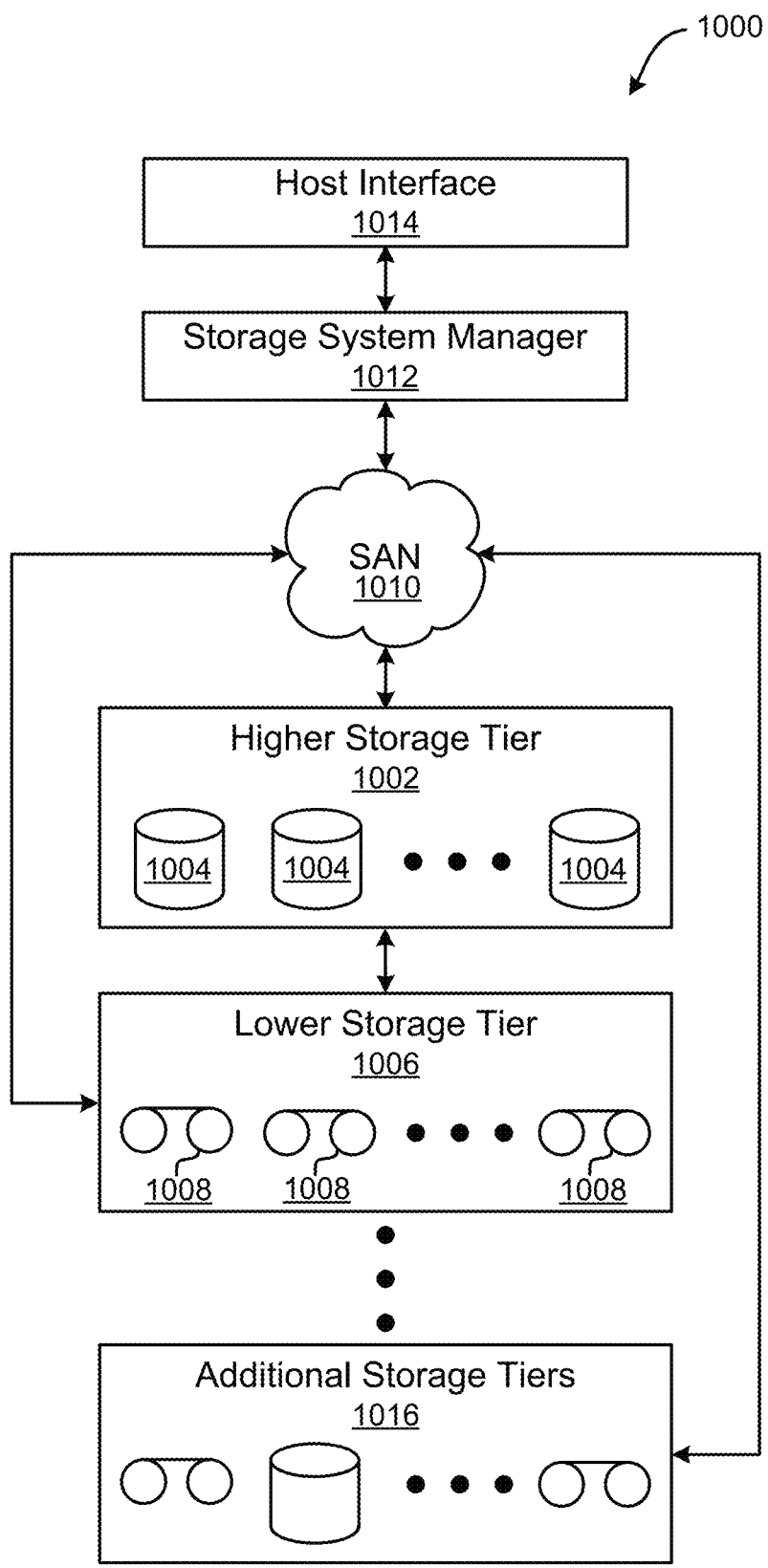
FIG. 10 is a tiered data storage system in accordance with one approach.

Moreover, FIG. 10 illustrates a storage system 1000 which implements high level (e.g., SSD) storage tiers in combination with lower level (e.g., magnetic tape) storage tiers, according to one approach. Note that some of the elements shown in FIG. 10 may be implemented as hardware and/or software, according to various approaches. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired approach.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus, the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the approaches presented herein.

According to some approaches, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

What is claimed is:

1. A computer-implemented method, comprising:
   determining a current read heat value of each logical page which corresponds to write requests that have accumulated in a destage buffer; and
   assigning each of the write requests to a respective write queue based on the current read heat value of each logical page which corresponds to the write requests, wherein each of the write queues correspond to a different page stripe which includes physical pages, wherein the physical pages included in each of the respective page stripes are of a same type.

2. The computer-implemented method of claim 1, comprising:
   determining whether a given write queue includes enough data in the respective write requests to fill a next page stripe which corresponds thereto;
   in response to determining the given write queue does not include enough data in the respective write requests to fill the next page stripe which corresponds thereto, determining whether an adjacent write queue includes enough data in the respective write requests to complete filling the next page stripe which corresponds to the given write queue; and
   destaging the data in the write requests from the given write queue and the adjacent write queue to the next page stripe which corresponds to the given write queue in response to determining that the adjacent write queue includes enough data in the respective write requests to complete filling the next page stripe which corresponds to the given write queue.

3. The computer-implemented method of claim 1, comprising:
   receiving a read request which corresponds to data stored in one or more logical pages;
   incrementing a read heat value associated with each of the one or more logical pages; and
   satisfying the read request.

4. The computer-implemented method of claim 1, comprising:
   receiving host write requests;
   storing the host write requests in the destage buffer;
   assigning each of the host write requests in the destage buffer to a supplemental write queue;
   destaging data in the host write requests from the supplemental write queue to physical pages in any of the page stripes; and
   resetting the current read heat values of logical pages which map to the physical pages the data in the host write requests are destaged to.

5. The computer-implemented method of claim 1, wherein the physical pages are implemented in quad-level cell (QLC) memory, wherein the types of physical pages include: lower pages, upper pages, extra pages, and top pages.

6. The computer-implemented method of claim 1, wherein each of the current read heat values are maintained using a 2-bit saturating counter.

7. A computer program product comprising a computer readable storage medium having program instructions embodied therewith, the program instructions readable and/or executable by a processor to cause the processor to:
   determine, by the processor, a current read heat value of each logical page which corresponds to write requests that have accumulated in a destage buffer; and
   assign, by the processor, each of the write requests to a respective write queue based on the current read heat value of each logical page which corresponds to the write requests, wherein each of the write queues correspond to a different page stripe which includes physical pages, wherein the physical pages included in each of the respective page stripes are of a same type.

8. The computer program product of claim 7, wherein the program instructions are readable and/or executable by the processor to cause the processor to:
   determine, by the processor, whether a given write queue includes enough data in the respective write requests to fill a next page stripe which corresponds thereto;
   in response to determining the given write queue does not include enough data in the respective write requests to fill the next page stripe which corresponds thereto, determine, by the processor, whether an adjacent write queue includes enough data in the respective write requests to complete filling the next page stripe which corresponds to the given write queue; and
   destage, by the processor, the data in the write requests from the given write queue and the adjacent write queue to the next page stripe which corresponds to the given write queue in response to determining that the adjacent write queue includes enough data in the respective write requests to complete filling the next page stripe which corresponds to the given write queue.

9. The computer program product of claim 7, the program instructions readable and/or executable by the processor to cause the processor to:
   receive, by the processor, a read request which corresponds to data stored in one or more logical pages;
   increment, by the processor, a read heat value associated with each of the one or more logical pages; and
   satisfy, by the processor, the read request.

10. The computer program product of claim 7, the program instructions readable and/or executable by the processor to cause the processor to:
    receive, by the processor, host write requests;
    store, by the processor, the host write requests in the destage buffer;
    assign, by the processor, each of the host write requests in the destage buffer to a supplemental write queue;
    destage, by the processor, data in the host write requests from the supplemental write queue to physical pages in any of the page stripes; and
    reset, by the processor, the current read heat values of logical pages which map to the physical pages the data in the host write requests are destaged to.

11. The computer program product of claim 7, wherein the physical pages are implemented in quad-level cell (QLC) memory, wherein the types of physical pages include: lower pages, upper pages, extra pages, and top pages.

12. The computer program product of claim 7, wherein each of the current read heat values are maintained using a 2-bit saturating counter.

13. A system, comprising:
    a plurality of non-volatile random access memory (NVRAM) blocks configured to store data; and a processor and logic integrated with and/or executable by the processor, the logic being configured to:

determine, by the processor, a current read heat value of each logical page which corresponds to write requests that have accumulated in a destage buffer; and assign, by the processor, each of the write requests to a respective write queue based on the current read heat value of each logical page which corresponds to the write requests, wherein each of the write queues correspond to a different page stripe which includes physical pages, wherein the physical pages included in each of the respective page stripes are of a same type.

14. The system of claim 13, the logic being configured to:

determine, by the processor, whether a given write queue includes enough data in the respective write requests to fill a next page stripe which corresponds thereto;

in response to determining the given write queue does not include enough data in the respective write requests to fill the next page stripe which corresponds thereto, determine, by the processor, whether an adjacent write queue includes enough data in the respective write requests to complete filling the next page stripe which corresponds to the given write queue; and destage, by the processor, the data in the write requests from the given write queue and the adjacent write queue to the next page stripe which corresponds to the given write queue in response to determining that the adjacent write queue includes enough data in the respective write requests to complete filling the next page stripe which corresponds to the given write queue.

15. The system of claim 13, the logic being configured to:

receive, by the processor, a read request which corresponds to data stored in one or more logical pages;

increment, by the processor, a read heat value associated with each of the one or more logical pages; and satisfy, by the processor, the read request.

16. The system of claim 13, the logic being configured to:

receive, by the processor, host write requests;

store, by the processor, the host write requests in the destage buffer;

assign, by the processor, each of the host write requests in the destage buffer to a supplemental write queue;

destage, by the processor, data in the host write requests from the supplemental write queue to physical pages in any of the page stripes; and reset, by the processor, the current read heat values of logical pages which map to the physical pages the data in the host write requests are destaged to.

17. The system of claim 13, wherein the physical pages are implemented in quad-level cell (QLC) memory, wherein the types of physical pages include: lower pages, upper pages, extra pages, and top pages.

18. The system of claim 13, wherein each of the current read heat values are maintained using a 2-bit saturating counter.

* * * * *